US012664836B2

(12) United States Patent
Bosatelli et al.

(10) Patent No.: US 12,664,836 B2
(45) Date of Patent: Jun. 23, 2026

(54) IN-VEHICLE MONITORING SYSTEM FOR SUPERVISED RIDE HAILING EXPERIENCES

(71) Applicant: Robert Bosch GmbH, Stuttgart (DE)

(72) Inventors: Simone Bosatelli, Stuttgart (DE); Philip Ventimiglia, Northville, MI (US); Stefan Weissert, Royal Oak, MI (US); Alicia Winters, Wixom, MI (US)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 18/245,443

(22) PCT Filed: Sep. 24, 2021

(86) PCT No.: PCT/EP2021/076410
§ 371 (c)(1),
(2) Date: Mar. 15, 2023

(87) PCT Pub. No.: WO2022/069375
PCT Pub. Date: Apr. 7, 2022

(65) Prior Publication Data
US 2023/0360449 A1     Nov. 9, 2023

Related U.S. Application Data

(60) Provisional application No. 63/084,862, filed on Sep. 29, 2020.

(51) Int. Cl.
*G07C 5/08* (2006.01)
*B60K 35/10* (2024.01)
(Continued)

(52) U.S. Cl.
CPC ........... *G07C 5/0825* (2013.01); *B60K 35/10* (2024.01); *B60K 35/22* (2024.01); *B60K 35/28* (2024.01);
(Continued)

(58) Field of Classification Search
CPC .... G07C 5/0825; G07C 5/008; G07C 5/0866; B60K 35/00; B60K 35/29; B60K 35/60;
(Continued)

(56) References Cited

U.S. PATENT DOCUMENTS 8,930,072 B1 * 1/2015 Lambert .............. G07C 5/0866
348/222.1
2012/0137256 A1 5/2012 Lalancette et al.
(Continued)

FOREIGN PATENT DOCUMENTS

CN 104766471 A 7/2015
EP 3 355 280 A1 8/2018
(Continued)

OTHER PUBLICATIONS

International Search Report corresponding to PCT Application No. PCT/EP2021/076410, mailed May 3, 2022 (English language document) (6 pages).

*Primary Examiner* — Aniss Chad
*Assistant Examiner* — Nikki Marie M Molina
(74) *Attorney, Agent, or Firm* — Maginot, Moore & Beck LLP

(57) ABSTRACT

An in-vehicle system for safe and supervised ride hailing experiences by a mobility service provider is disclosed. The system advantageously comprises a monitoring device which is installed in the vehicle by the driver. The monitoring device enables a monitoring feature in which it records audio and video data during rides in the vehicle. If necessary, such as for resolving a dispute or in the event of an accident, the monitoring device uploads the recorded data to a cloud storage backend. The monitoring device has a recognizable design and is integrated with mobility service provider applications used by both the driver of the vehicle and the riders who hail rides. The services of the monitoring device are operated by a trusted, neutral third-party. The (Continued)

trusted, neutral third-party may provide live qualified support at the touch of a button in an emergency or if the rider/driver simply feels uncomfortable or unsafe.

10 Claims, 27 Drawing Sheets

(51) Int. Cl.

| | |
|---|---|
| *B60K 35/21* | (2024.01) |
| *B60K 35/22* | (2024.01) |
| *B60K 35/26* | (2024.01) |
| *B60K 35/28* | (2024.01) |
| *B60K 35/29* | (2024.01) |
| *B60K 35/60* | (2024.01) |
| *G06Q 10/02* | (2012.01) |
| *G06Q 50/47* | (2024.01) |
| *G07C 5/00* | (2006.01) |

(52) U.S. Cl.
CPC ............. *G06Q 10/02* (2013.01); *G06Q 50/47* (2024.01); *G07C 5/008* (2013.01); *G07C 5/0866* (2013.01); *B60K 35/21* (2024.01); *B60K 35/26* (2024.01); *B60K 35/29* (2024.01); *B60K 35/60* (2024.01); *B60K 2360/1868* (2024.01); *B60K 2360/188* (2024.01); *B60K 2360/797* (2024.01)

(58) Field of Classification Search
CPC ...... B60K 2360/1868; B60K 2360/188; B60K 2360/797; B60K 35/26; B60K 35/10; B60K 35/22; B60K 35/28; B60K 35/21; G06Q 10/02; G06Q 50/47; G06Q 10/04; G06Q 10/08355; G06Q 50/40; G06Q 10/00; G08B 25/016
See application file for complete search history.

(56) References Cited

U.S. PATENT DOCUMENTS

| | | | |
|---|---|---|---|
| 2014/0285337 A1 | 9/2014 | Gebhardt | |
| 2017/0341611 A1* | 11/2017 | Baker ..................... | B60R 21/16 |
| 2018/0048850 A1 | 2/2018 | Bostick et al. | |
| 2018/0190110 A1 | 7/2018 | Demisse et al. | |
| 2019/0375375 A1 | 12/2019 | Nakamura | |
| 2020/0077292 A1 | 3/2020 | Tsuyunashi et al. | |
| 2020/0082188 A1* | 3/2020 | Singh ................... | G08B 25/016 |
| 2020/0097737 A1* | 3/2020 | Oesterling ........... | G06T 3/4038 |
| 2020/0349666 A1* | 11/2020 | Hodge ............... | G01C 21/3602 |
| 2021/0027409 A1* | 1/2021 | Nair ....................... | H04N 23/60 |
| 2021/0073825 A1* | 3/2021 | Walling ................ | G06Q 50/40 |
| 2021/0261048 A1* | 8/2021 | Sadok ................... | B60Q 1/545 |
| 2022/0080879 A1* | 3/2022 | Moon ................... | B60Q 1/547 |

FOREIGN PATENT DOCUMENTS

| | | |
|---|---|---|
| WO | 2017/075457 A1 | 5/2017 |
| WO | 2019/136066 A1 | 7/2019 |
| WO | 2019/152471 A2 | 8/2019 |

* cited by examiner

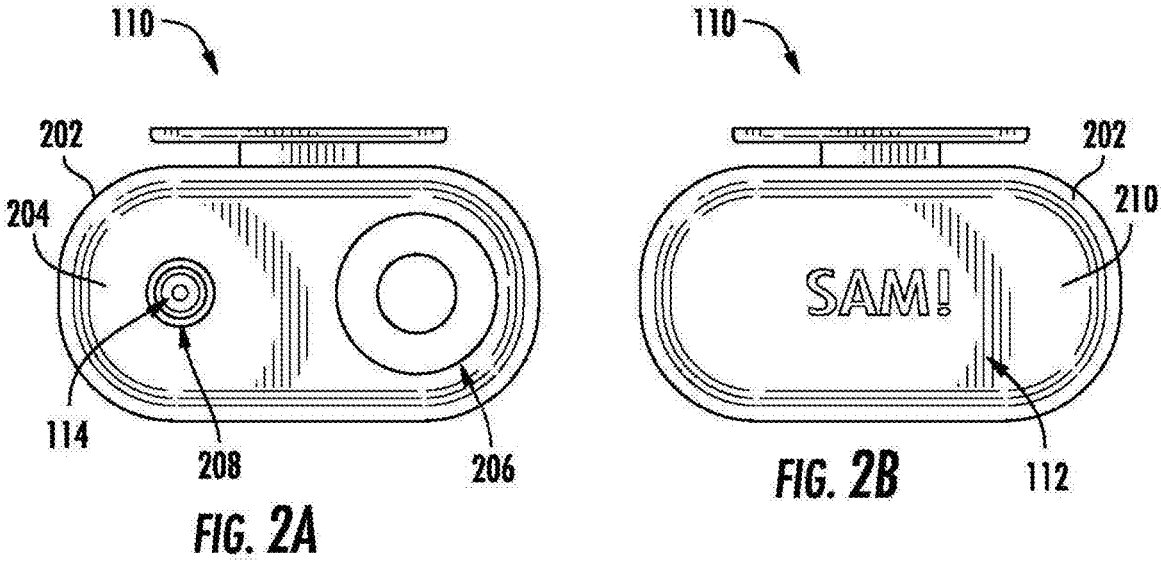
FIG. 2A
FIG. 2B
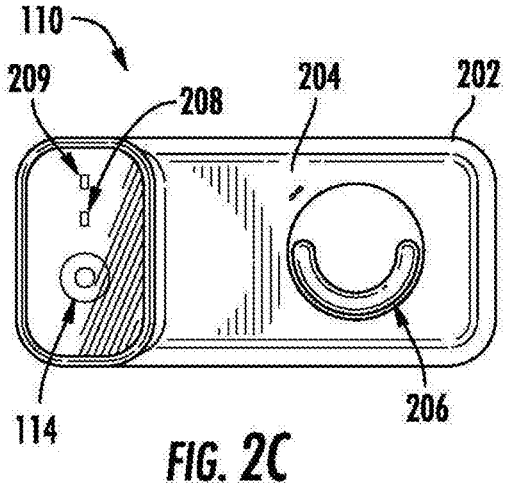
FIG. 2C
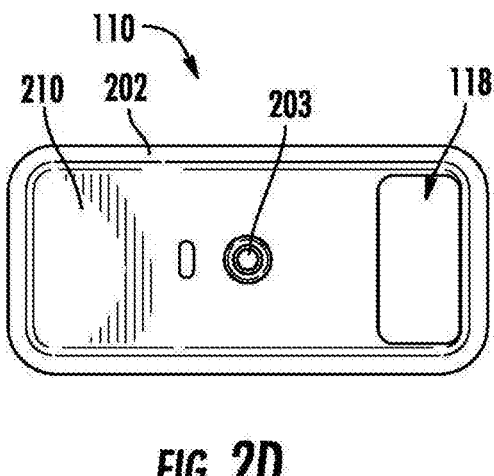
FIG. 2D

150

230

EMERGENCY

232

150

PANIC BUTTON

TRANSMITTER 234

BUTTON 232

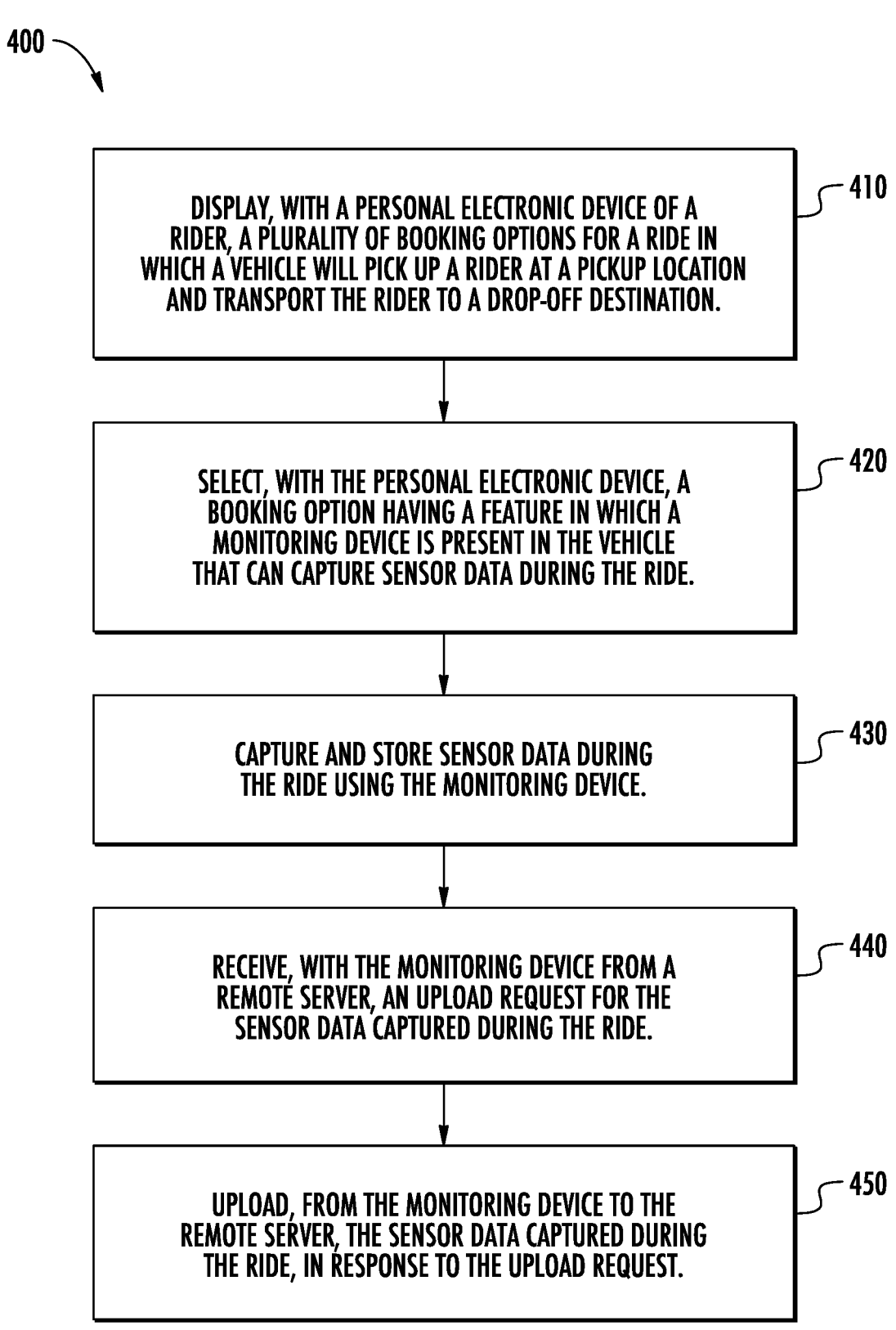

400

DISPLAY, WITH A PERSONAL ELECTRONIC DEVICE OF A RIDER, A PLURALITY OF BOOKING OPTIONS FOR A RIDE IN WHICH A VEHICLE WILL PICK UP A RIDER AT A PICKUP LOCATION AND TRANSPORT THE RIDER TO A DROP-OFF DESTINATION.        410

SELECT, WITH THE PERSONAL ELECTRONIC DEVICE, A BOOKING OPTION HAVING A FEATURE IN WHICH A MONITORING DEVICE IS PRESENT IN THE VEHICLE THAT CAN CAPTURE SENSOR DATA DURING THE RIDE.        420

CAPTURE AND STORE SENSOR DATA DURING THE RIDE USING THE MONITORING DEVICE.        430

RECEIVE, WITH THE MONITORING DEVICE FROM A REMOTE SERVER, AN UPLOAD REQUEST FOR THE SENSOR DATA CAPTURED DURING THE RIDE.        440

UPLOAD, FROM THE MONITORING DEVICE TO THE REMOTE SERVER, THE SENSOR DATA CAPTURED DURING THE RIDE, IN RESPONSE TO THE UPLOAD REQUEST.        450

FIG. 4

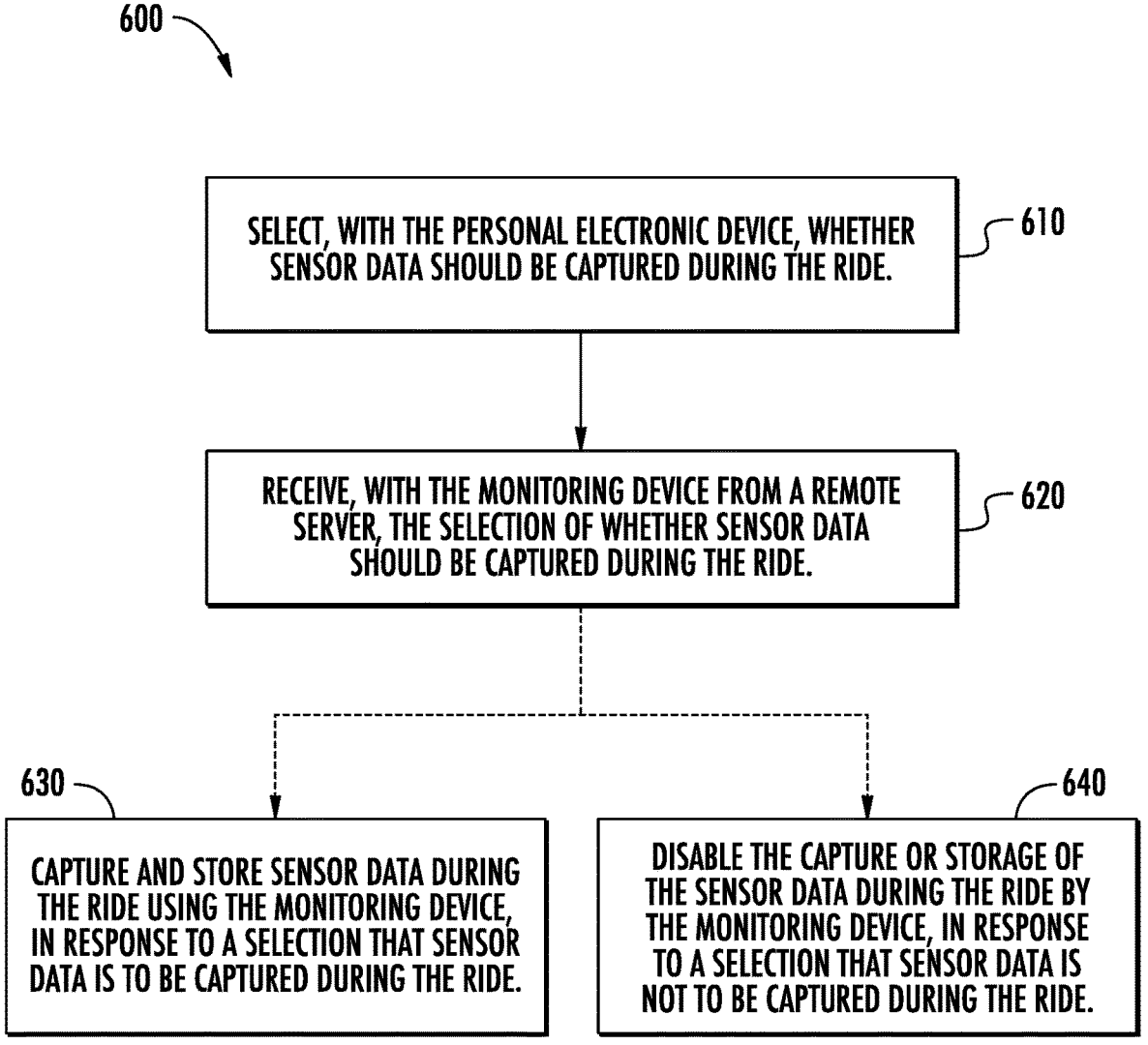

600

SELECT, WITH THE PERSONAL ELECTRONIC DEVICE, WHETHER SENSOR DATA SHOULD BE CAPTURED DURING THE RIDE.    610

RECEIVE, WITH THE MONITORING DEVICE FROM A REMOTE SERVER, THE SELECTION OF WHETHER SENSOR DATA SHOULD BE CAPTURED DURING THE RIDE.    620

630
CAPTURE AND STORE SENSOR DATA DURING THE RIDE USING THE MONITORING DEVICE, IN RESPONSE TO A SELECTION THAT SENSOR DATA IS TO BE CAPTURED DURING THE RIDE.

640
DISABLE THE CAPTURE OR STORAGE OF THE SENSOR DATA DURING THE RIDE BY THE MONITORING DEVICE, IN RESPONSE TO A SELECTION THAT SENSOR DATA IS NOT TO BE CAPTURED DURING THE RIDE.

FIG. 6

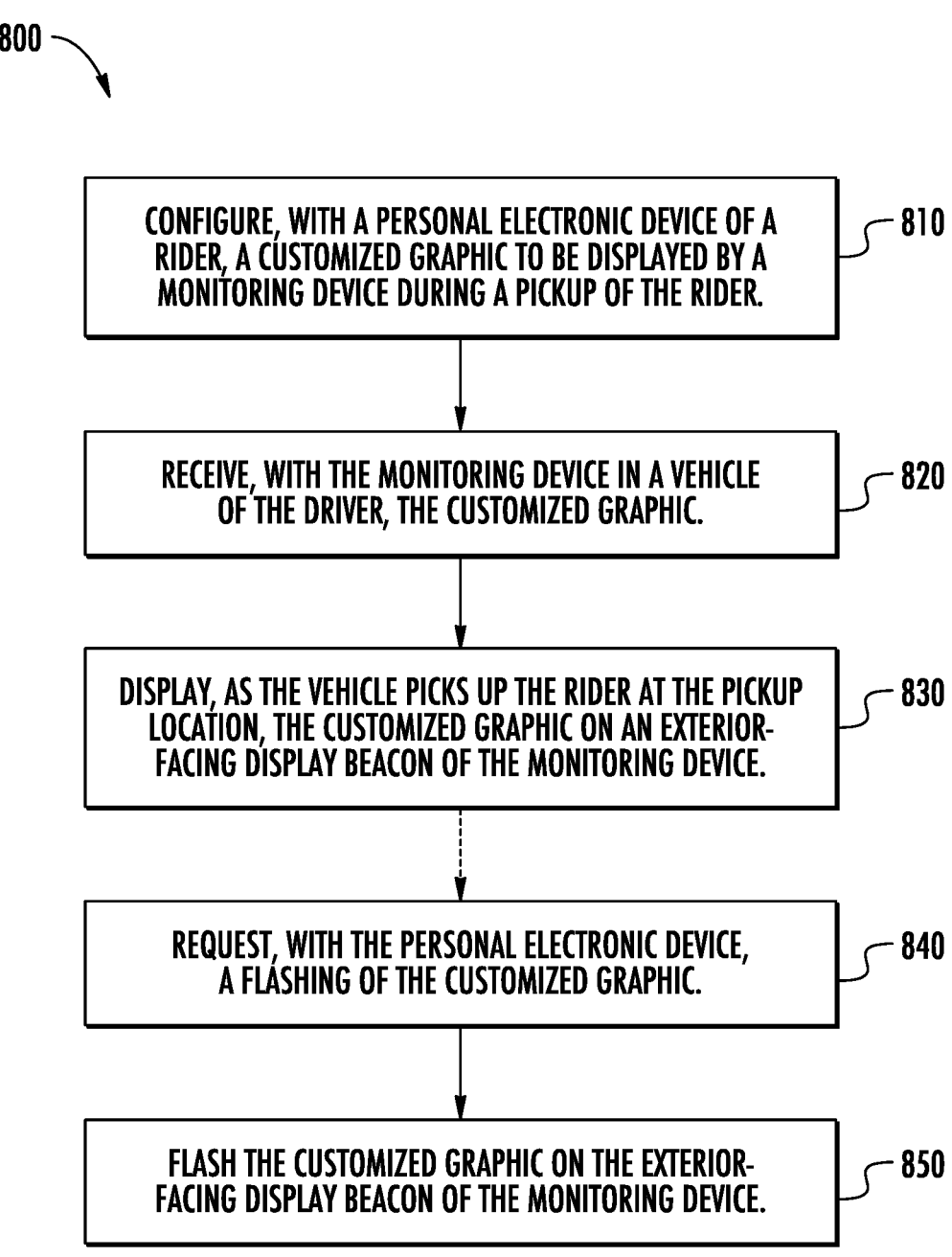

800

CONFIGURE, WITH A PERSONAL ELECTRONIC DEVICE OF A RIDER, A CUSTOMIZED GRAPHIC TO BE DISPLAYED BY A MONITORING DEVICE DURING A PICKUP OF THE RIDER. — 810

RECEIVE, WITH THE MONITORING DEVICE IN A VEHICLE OF THE DRIVER, THE CUSTOMIZED GRAPHIC. — 820

DISPLAY, AS THE VEHICLE PICKS UP THE RIDER AT THE PICKUP LOCATION, THE CUSTOMIZED GRAPHIC ON AN EXTERIOR-FACING DISPLAY BEACON OF THE MONITORING DEVICE. — 830

REQUEST, WITH THE PERSONAL ELECTRONIC DEVICE, A FLASHING OF THE CUSTOMIZED GRAPHIC. — 840

FLASH THE CUSTOMIZED GRAPHIC ON THE EXTERIOR-FACING DISPLAY BEACON OF THE MONITORING DEVICE. — 850

FIG. 8

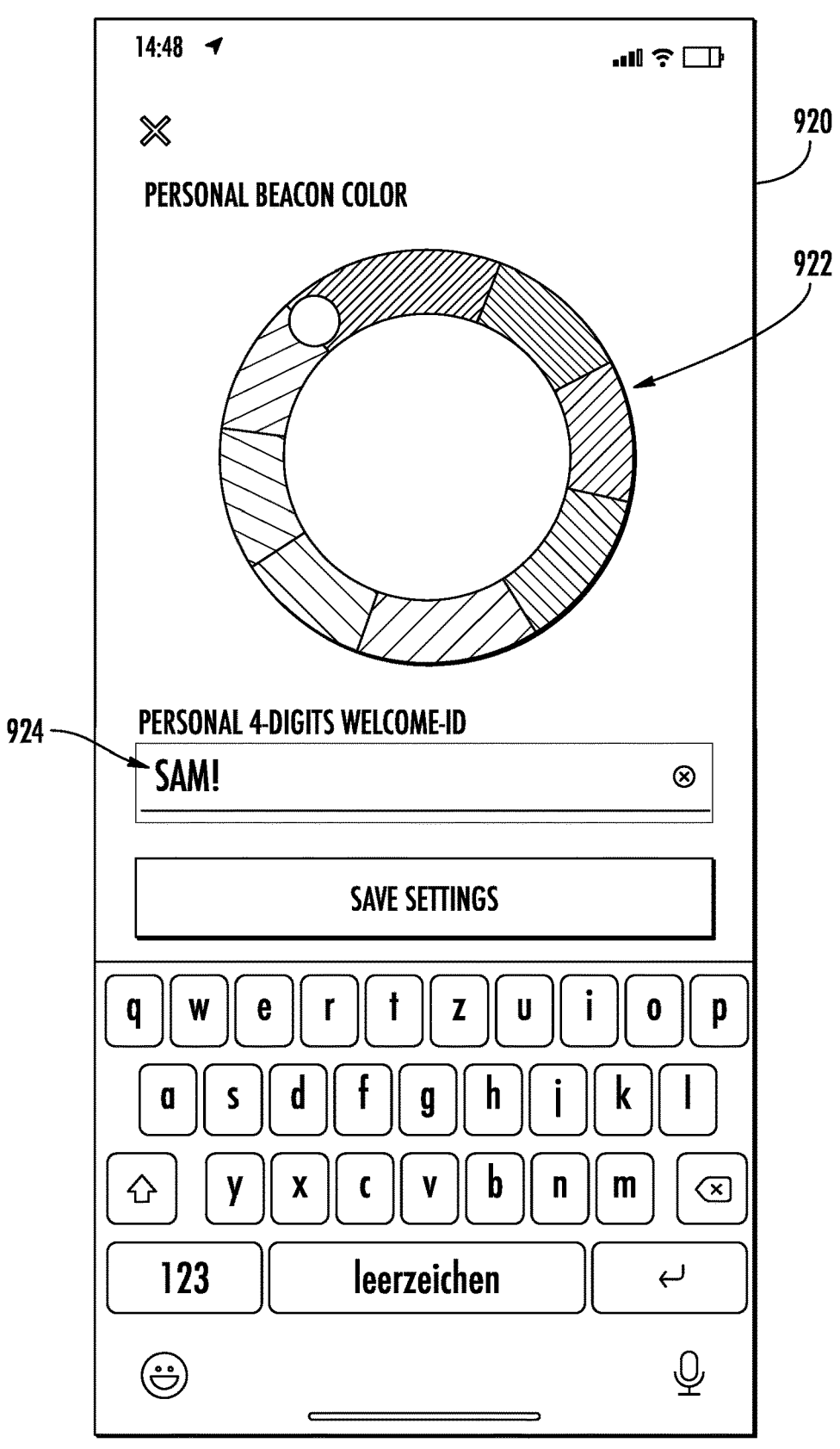
FIG. *9B*

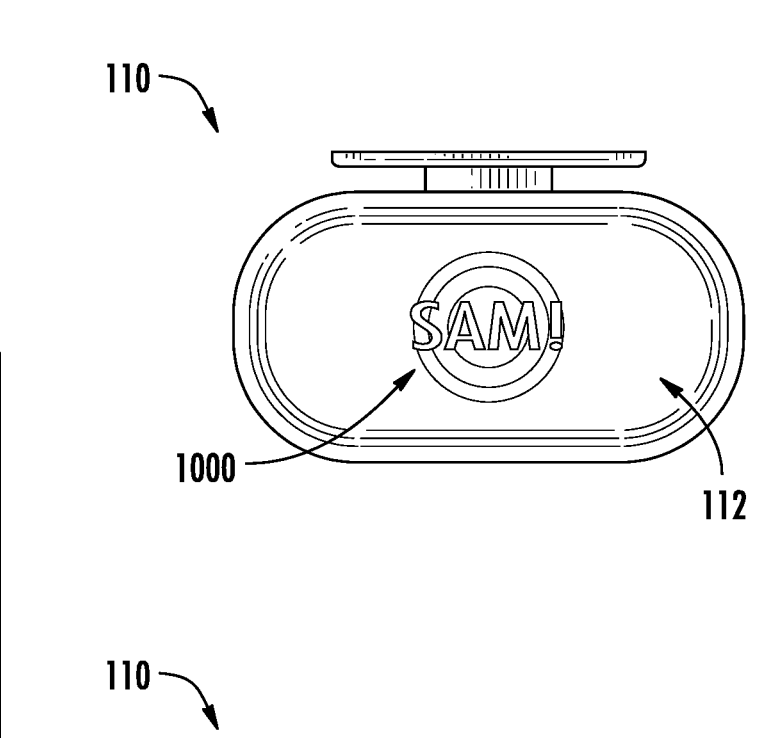
FLASH
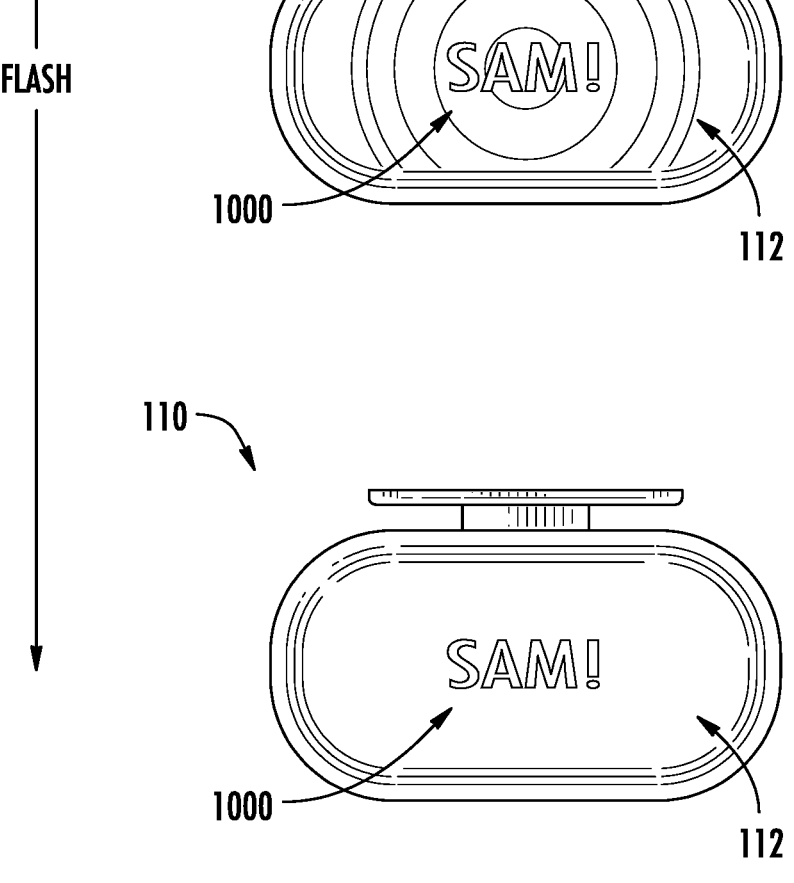
*FIG. 10*

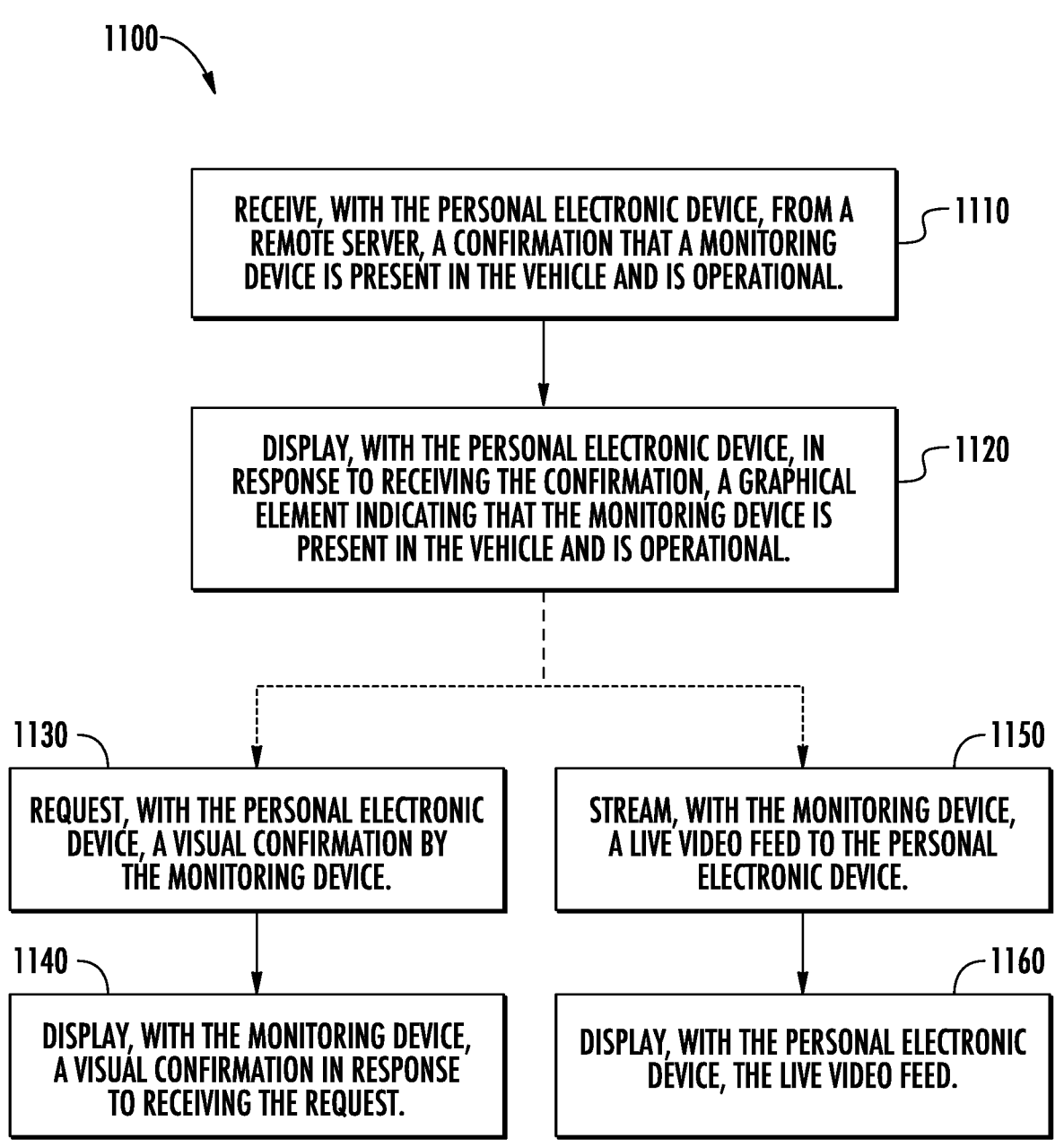

1100

RECEIVE, WITH THE PERSONAL ELECTRONIC DEVICE, FROM A REMOTE SERVER, A CONFIRMATION THAT A MONITORING DEVICE IS PRESENT IN THE VEHICLE AND IS OPERATIONAL. — 1110

DISPLAY, WITH THE PERSONAL ELECTRONIC DEVICE, IN RESPONSE TO RECEIVING THE CONFIRMATION, A GRAPHICAL ELEMENT INDICATING THAT THE MONITORING DEVICE IS PRESENT IN THE VEHICLE AND IS OPERATIONAL. — 1120

1130 — REQUEST, WITH THE PERSONAL ELECTRONIC DEVICE, A VISUAL CONFIRMATION BY THE MONITORING DEVICE.

1150 — STREAM, WITH THE MONITORING DEVICE, A LIVE VIDEO FEED TO THE PERSONAL ELECTRONIC DEVICE.

1140 — DISPLAY, WITH THE MONITORING DEVICE, A VISUAL CONFIRMATION IN RESPONSE TO RECEIVING THE REQUEST.

1160 — DISPLAY, WITH THE PERSONAL ELECTRONIC DEVICE, THE LIVE VIDEO FEED.

*FIG. 11*

IN-VEHICLE MONITORING SYSTEM FOR SUPERVISED RIDE HAILING EXPERIENCES

This application is a 35 U.S.C. § 371 National Stage Application of PCT/EP2021/076410, filed on Sep. 24, 2021, which claims the benefit of priority of U.S. provisional application Ser. No. 63/084,862, filed on Sep. 29, 2020 the disclosures of which are herein incorporated by reference in its entirety.

FIELD

The device and method disclosed in this document relates to in-vehicle monitoring and, more particularly, to in-vehicle monitoring of rides of a mobility service provider.

BACKGROUND

Unless otherwise indicated herein, the materials described in this section are not admitted to be the prior art by inclusion in this section.

Mobility service providers will play an increasingly important role in transportation as fewer people own their own vehicles and rely more on on-demand mobility services for their transportation needs. Some mobility service providers, such as ride share and taxi service providers, facilitate transactions between strangers in which a rider requests a ride using a smart phone application or by some other means and a driver picks up the rider and transports the rider to a desired destination in exchange for a fare. Naturally, there are occasions when disputes arise between the rider and the driver or between riders during the ride, or when some other anomalous event occurs during the ride. Accordingly, it would be beneficial to provide a system for monitoring rides provided by such mobility service providers.

SUMMARY

A system is disclosed for monitoring a ride in which a vehicle picks up a rider at a pickup location and transports the rider to a drop-off destination. The system comprises at least one sensor arranged in the vehicle and configured to capture sensor data during the ride. The system further comprises a transceiver configured to communicate with at least one remote server. The system further comprises a memory configured to store data. The system further comprises a processor operatively connected to the at least one sensor, the transceiver, and the memory. The processor is configured to receive, from the at least one remote server via the transceiver, a signal indicating whether first sensor data is to be stored during the ride. The signal depends on a selection from the rider. The processor further is configured to operate, in response to the signal indicating that the first sensor data is to be captured during the ride, the at least one sensor to capture the first sensor data during the ride and store the first sensor data captured during the ride in the memory.

A further system is disclosed for monitoring a ride in which a vehicle picks up a rider at a pickup location and transports the rider to a drop-off destination. The system comprises at least one sensor arranged in the vehicle and configured to capture sensor data during the rides. The system further comprises a display device arranged within the vehicle so as to be visible from outside the vehicle. The system further comprises a transceiver configured to communicate with at least one remote server. The system further comprises a memory configured to store data. The system further comprises a processor operatively connected to the at least one sensor, the transceiver, and the memory. The processor is configured to receive, from the at least one remote server via the transceiver, data indicating a customization that is associated with the rider. The processor is further configured to display, prior to the vehicle picking up the rider at the pickup location, a graphical element on the display device. The graphical element is customized based on the customization. The processor is configured to receive, and store in the memory, sensor data from the at least one sensor captured during the ride.

Yet another system is disclosed for monitoring a ride in which a vehicle picks up a rider at a pickup location and transports the rider to a drop-off destination. The system comprises at least one sensor arranged in the vehicle and configured to capture sensor data during the ride. The system further comprises a button arranged within the vehicle. The system further comprises a transceiver configured to communicate with at least one remote server. The system further comprises a memory configured to store data. The system further comprises a processor operatively connected to the at least one sensor, the button, the transceiver, and the memory. The processor is configured to, in response to the button being pressed during the ride, transmit a request to the at least one remote server via the transceiver. The request is configured to one of (i) cause a third party to monitor the first sensor data captured by the at least one sensor and (ii) cause an emergency service provider to be sent to a location of the vehicle.

BRIEF DESCRIPTION OF THE DRAWINGS

The foregoing aspects and other features of the system for monitoring rides are explained in the following description, taken in connection with the accompanying drawings.

FIGS. 2A and 2B show a first exemplary embodiment of the monitoring device of FIG. 1.

FIGS. 2C and 2D show a second exemplary embodiment of the monitoring device of FIG. 1.

FIG. 4 shows a method for hailing and monitoring a ride of the mobility service provider.

FIG. 6 shows a method for enabling rider control of whether sensor data is captured during a ride of the mobility service provider.

FIG. 8 shows a method for providing interactive ride pick up for a ride of the mobility service provider.

FIGS. 9A and 9B show exemplary graphical user interfaces for adjusting account settings and customizing the welcome graphic for a user.

FIG. 10 shows an exemplary process for flashing a welcome graphic on the exterior-facing beacon of the monitoring device.

FIG. 11 shows a method for providing confirmation to the rider that a monitoring device is active and operational during a ride.

DETAILED DESCRIPTION

Figure 1:
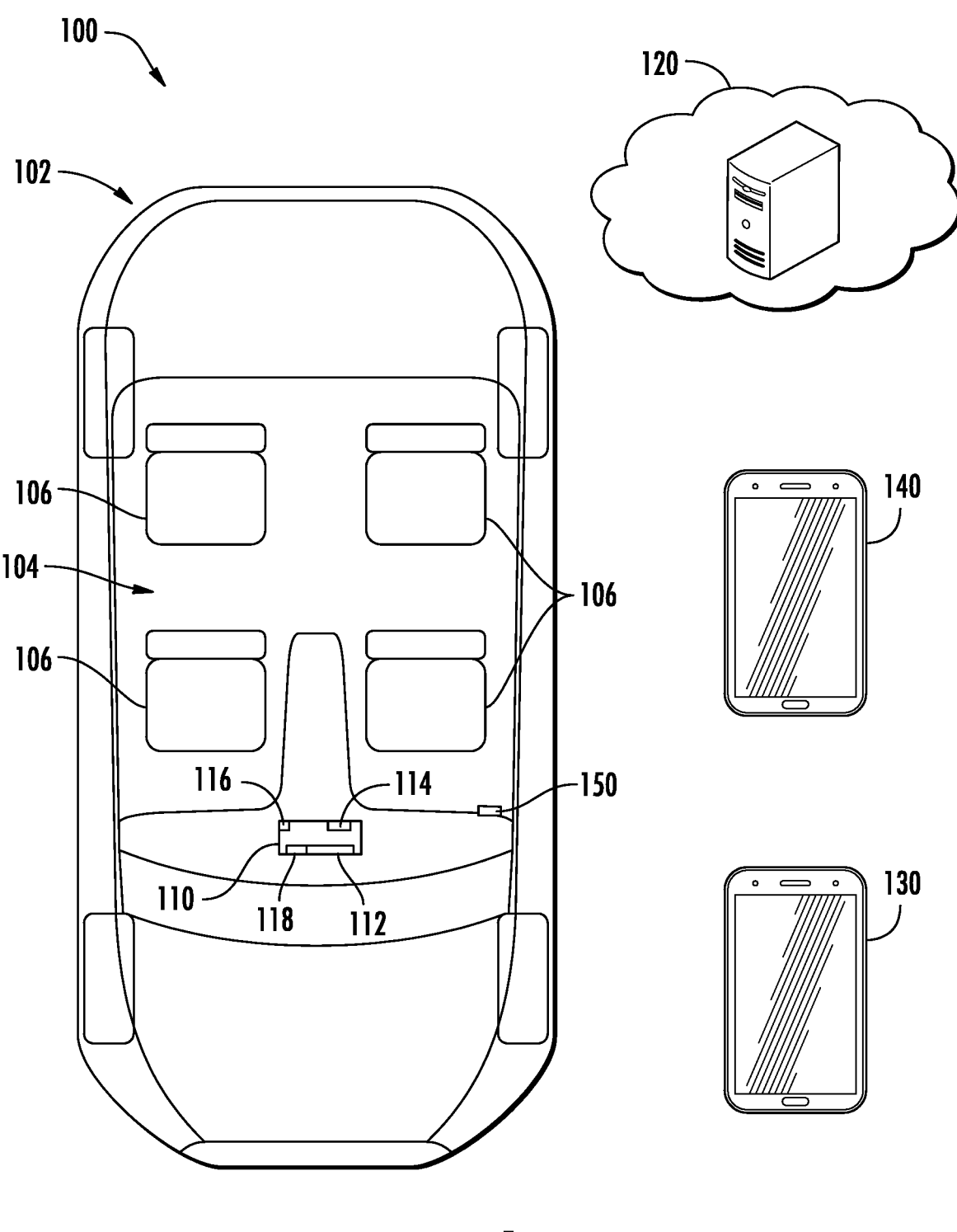
FIG. 1 shows a system for monitoring rides provided by a mobility service provider in a vehicle.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

System Overview

FIG. 1 shows an exemplary embodiment of a system 100 for monitoring rides provided by a mobility service provider using a vehicle 102. Non-limiting examples of such mobility service providers include LyftTM and UberTM. The system 100 at least comprises a monitoring device 110 arranged in the vehicle 102, and a cloud storage backend 120 that is remote from the vehicle 102. The monitoring device 110 has a recognizable design and is advantageously integrated with mobility service provider applications used by both the driver of the vehicle and the riders who hail rides. By way of these integrations, the monitoring device 110 communicates clearly to both drivers and riders that it is working properly and provides reassurance that someone is there if something goes wrong. To this end, the services of the system 100 are operated by a trusted, neutral third-party. The trusted, neutral third-party may provide live qualified support at the touch of a button in an emergency or if the rider/driver simply feels uncomfortable or unsafe. In this way, the monitoring device 110 provides an objective witness and assures both drivers and riders that their data is safe and protected in the hands of a capable partner. Thus, the monitoring device 110 represents an unspoken agreement between the rider and the driver, and delivers a differentiated user experience starting before the rider even books their first companion ride.

The monitoring device 110 includes a plurality of sensors at least including a cabin-facing camera 114 and at least one interior microphone 116. In some embodiments, the monitoring device 110 further includes an exterior-facing camera 118. In some embodiments, the monitoring device 110 further includes an exterior-facing beacon 112 configured to display information to pedestrians outside the vehicle. The monitoring device 110 is configured to record data from the sensors during rides in the vehicle 102 and to store the recorded data in a local storage device. In the event of dispute or other anomalous event, the recorded data may be uploaded to the cloud storage backend 120 for further review by an agent of the mobility service provider or of the cloud storage service provider.

In at least one embodiment, the system 100 further includes a panic button 150, which is communicatively connected with the monitoring device 110, for example by a wired or wireless connection. The panic button 150 can be configured to perform some emergency function of the system 100, such as requesting a live monitoring of the vehicle 102 by a support agent or requesting that an emergency service provider be sent to the location of the vehicle (e.g., police, ambulance, or equivalent emergency service providers).

In the illustrated embodiment of FIG. 1, the vehicle 102 is in the form of an automobile having a cabin 104, which is a typically closed room for accommodating passengers. In the illustrated embodiment, the cabin 104 includes four seats 106 including a driver's seat and multiple passengers' seats. However, the cabin 104 may include more or less seats depending on the configuration and type of the vehicle 102. The vehicle 102 also includes one or more doors (not shown) enabling passengers to access the cabin 104 and the seats 106. In addition, the vehicle 102 may include a rear hatch (not shown) enabling a user to access a cargo storage area of the vehicle 102, for example a trunk or storage space behind the rear seats.

The monitoring device 110 is arranged within the cabin 104 such that the cabin-facing camera 114 has a view of all or most of the seats 106 within the cabin 104, such that exterior-facing camera 118 has a view of the road ahead of the vehicle 102, and such that the exterior-facing beacon 112 is visible from the road ahead of the vehicle 102. In at least one embodiment, the monitoring device 110 is in the form of a retrofit device that is attached to a dash or windshield of the vehicle and in which all or most of the components thereof are contained within an integrated package. However, in alternative embodiments, the monitoring device 110 may be natively or otherwise integrated with the vehicle 102 and the components thereof, for example the sensors, may be distributed throughout the vehicle 102.

The system 100 is configured to operate in conjunction with mobility service provider applications that are executed on personal electronic devices 130 and 140, such as smart phones, in the possession of the driver and the rider respectively. Such mobility service provider applications may, for example, enable the rider to initiate a ride request and the driver to receive the ride requests. Upon receiving a ride request, the driver may opt to perform the requested ride in exchange for a fare. Generally, performance of each ride consists of driving the vehicle 102 to a pick-up location at which the rider is located, accepting the rider into the vehicle 102, driving the vehicle 102 to a desired drop-off destination, and stopping at the drop-off destination to allow the rider to disembark. Upon completion of the ride, the rider is generally charged a fare by the mobility service provider, some portion of which is provided to the driver.

During each ride, the monitoring device 110 is configured to record sensor data, for example including interior video from the cabin-facing camera 114, interior audio from the interior microphone 116, and exterior video from the exterior-facing camera 118. The sensor data for each ride is stored in a local memory of the monitoring device 110 and, in some circumstances, is uploaded to the cloud storage backend 120 for further review by an agent of the mobility service provider or of the cloud storage service provider.

In some embodiments, the monitoring device 110 is advantageously configured to annotate the recorded sensor data with useful metadata about each particular ride. As an example, the recorded sensor data can be stored with metadata identifying the particular ride, driver, and rider, and with timestamps identifying a ride hail time, pick-up time, and drop-off time. To this end, the monitoring device 110 is configured to communicate with the mobility service provider application on the personal electronic device 130 of the driver, either directly or indirectly via a server backend of the mobility service provider, in order to obtain information about each particular ride provided by the driver using the mobility service provider application.

Additionally, in some embodiments, the monitoring device 110 can be used by the driver for private use while not providing rides for the mobility service provider. Particularly, while in use at times other than during a ride for the mobility service provider, the sensors of the monitoring device 110 are operated to capture sensor data, which is stored data in a memory of the monitoring device 110. In this way, the monitoring device 110 provides value to the drivers even outside of its use for the mobility service provider.

System for In-Vehicle Monitoring

With reference to FIGS. 2A-2D, two exemplary embodiments of the monitoring device 110 are described. The monitoring device 110 includes a housing 202 that is configured to mount on a dash of the vehicle 102 or on a windshield of the vehicle. The housing 202 is designed to retain and protect the various sensors and other electronic components within the housing 202. The housing comprises any number of shapes, configurations, and/or materials. In one embodiment, the housing is configured to engage with a mount that is semi-permanently attached to a surface such as a dash or windshield of the vehicle 102 to allow for retrofit installations. The mount may attach to a mounting hole 203 on a backside of the housing 202 (as seen in the embodiment of FIG. 2D) Similarly, the housing 202 may itself include some other mechanism, such as a suction cup or adhesive, for semi-permanent attachment. However, in some embodiments, the monitoring device 110 may be natively or otherwise integrated with the vehicle 102 and the components thereof may be distributed throughout the vehicle 102.

As shown in FIG. 2A and 2C, the housing 202 has an opening in an interior-facing side 204 in which the cabin-facing camera 114 is mounted. An information light 206 and a recording status indicator 208 are also arranged on the interior-facing side 204. In the illustrated embodiments, the information light 206 takes the form of a ring which can illuminate different portions thereof to indicate different information and statuses regarding the monitoring device 110. For example, a bottom-half light ring may indicate a first status and a full light ring may indicate a second status. As another example, the ring may take on different colors depending on a mode of operation (e.g., a green ring light while recording rides of the mobility service provider, a blue ring light while recording during private use by the driver, and a red ring light while in an emergency mode). Additionally, the recording status indicator 208 takes the form of a light arranged near the cabin-facing camera 114 that lights up red (or some other color) to indicate when the monitoring device 110 is recording. In the embodiment of FIG. 2A, the recording status indicator 208 takes the form of a ring that encompasses the opening in which the cabin-facing camera 114 is mounted. In the embodiment of FIG. 2C, the further status indicator 209 is arranged on the interior-facing side 204. In at least one embodiment, the information light 206 and/or the further status indicator 209 are configured to light up in a particular manner to indicate that the monitoring device 110 is paired with the driver's personal electronic device 130. In at least one embodiment, the information light 206 and/or the further status indicator 209 are configured to light up in a particular manner to indicate that the monitoring device 110 is connected to the cloud storage backend 120 and/or the server backend of the mobility service provider.

As shown in the embodiment of FIG. 2B, the exterior-facing beacon 112 is formed as a part of an exterior-facing side 210 of the housing 202. The exterior-facing beacon 112 takes the form of a display device and is configured to display a customizable welcome graphic including text and colors (e.g., the text "SAM!" with a green colored background). In contrast, in the embodiment of FIG. 2D, the housing 202 has an opening in an exterior-facing side 210 in which the exterior-facing camera 118 is mounted. Of course, further embodiments may incorporate both of the exterior-facing beacon 112 and the exterior-facing camera 118.

Figure 2E:
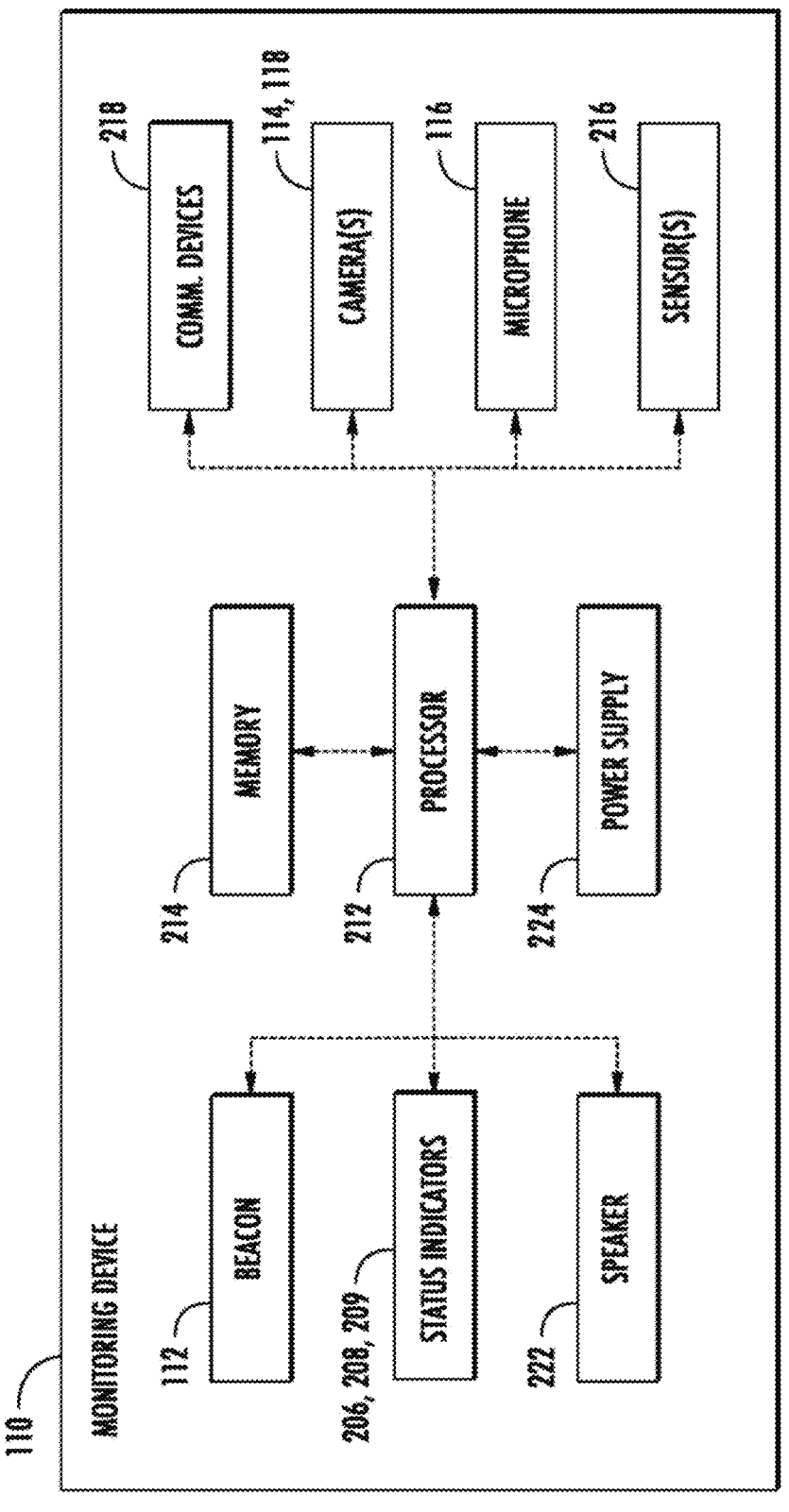
FIG. 2E shows exemplary hardware components of the monitoring device of FIG. 1.

With reference to FIG. 2E, exemplary components of the monitoring device 110 are described. In the illustrated embodiment, the monitoring device 110 comprises at least one processor 212 and associated memory 214. Additionally, the processor 212 is operatively connected to the exterior-facing beacon 112, the cabin-facing camera 114, the exterior-facing camera 118, the microphone 116, one or more additional sensors 216, one or more communication devices 218, one or more status indicators 206, 208, 209, a speaker 222, and a power supply 224.

It will be recognized by those of ordinary skill in the art that a "processor" includes any hardware system, hardware mechanism or hardware component that processes data, signals or other information. Accordingly, the processor 212 may comprise a central processing unit, graphics processing units, multiple processing units, dedicated circuitry for achieving functionality, programmable logic, or other processing systems. The memory 214 may be of any types of devices capable of storing information accessible by the processor 212, such as a flash memory card, ROM, RAM, hard drives, discs, or any of various other computer-readable medium serving as volatile or non-volatile data storage devices, as will be recognized by those of ordinary skill in the art. In at least one embodiment, the memory 214 includes both volatile memory and non-volatile memory.

The exterior-facing beacon 112 of the monitoring device 110 is a display device, such as a LCD/OLED screen or an LED matrix, configured to display information to pedestrians outside the vehicle. In at least some embodiments, the exterior-facing beacon 112 is configured to display, at least during pickup of a rider, a welcome graphic including text and colors (e.g., the text "SAM!" with a green colored background) that is customizable by the respective rider. In some embodiments, the exterior-facing beacon 112 may also display a trademark or logo of the mobility service provider, for example during pickup if a rider did not customize a welcome graphic or at a time other than during pickup.

The cabin-facing camera 114 of the monitoring device 110 is configured to capture video of the interior cabin 104 at least during rides provided by the mobility service provider. Likewise, the exterior-facing camera 118 of the monitoring device 110 is configured to capture video of a surrounding environment of the vehicle 120, such as the road ahead of the vehicle 102, at least during rides provided by the mobility service provider. The cameras 114, 118 each comprises, for example, an image sensor configured to capture video with, for example, a 1080p resolution at 30 frames-per-second, a 720p resolution at 60 frames-per-second, or both. The captured video generally takes the form of a sequence of image frames, each of which comprises a two-dimensional array of pixels having photometric information (i.e., intensity, color, and/or brightness).

The microphone 116 of the monitoring device 110 may comprise any type of acoustic sensor configured to record sounds within the cabin 104. In at least one embodiment, the monitoring device 110 comprises at least two microphones 116 spaced apart from one another so as to record stereo audio of the cabin 104.

The additional sensors 216 of the monitoring device 110 may include a variety of types of sensors. In one embodiment, additional sensors 216 include an inertial measurement unit (IMU) that operates as both an accelerometer and a gyroscope and may include a discrete accelerometer and a discrete gyroscope, or a single combined sensor that provides both acceleration and gyroscopic measurements. In one embodiment, additional sensors 216 include a temperature sensor that is leveraged for thermal protection features. In one embodiment, the additional sensors 216 include a particle sensor configured to detect particulate matter having sizes or masses associated with smoke or with other airborne particles or water vapor. In one embodiment, the additional sensors 216 include an environmental sensor configured to detect properties indicative of the air quality in the cabin such as relative humidity, barometric pressure, and presence of organic compounds, more particularly volatile organic compounds ("VOCs").

The communication devices 218 of the monitoring device 110 may include a variety of receivers, transmitters, and transceivers configured to communicate with a variety of local and remote devices, such as the remote sensors, the personal electronic devices 130, 140, the cloud storage backend 120, or a backend server of the mobility service provider. In one embodiment, the communication devices 218 include a Bluetooth® module. The Bluetooth® module comprises, for example, a Bluetooth® transceiver and a Bluetooth® antenna, as well as any other processors, memories, oscillators, or other hardware conventionally included in a Bluetooth® module. In one embodiment, the communication devices 218 include a cellular module. The cellular module comprises, for example, a cellular transceiver including a cellular telephony modem (e.g., an LTE modem), a cellular antenna, and a subscriber identification module (SIM) card, as well as any other processors, memories, oscillators, or other hardware conventionally included in a cellular module. In one embodiment, the communication devices 218 include a Global Navigation Satellite System (GNSS) module. The GNSS module comprises, for example, a GNSS receiver, an amplifier, and an antenna, as well as any other processors, memories, oscillators, or other hardware conventionally included in a GNSS module.

The status indicators of the monitoring device 110 at least include the information light 206 and the recording status indicator 208, but may include a variety of other status indicators configured to indicate a status, mode, or operation of the monitoring device 110, such as a power indicator or a pairing indicator. The status indicators generally comprise LEDs, but may include any kind of light.

The speaker 222 of the monitoring device 110 is configured to output sound into the cabin 104 of the vehicle 102 and may comprise any type of acoustic output device configured to output sounds within the cabin 104.

The power supply 224 of the monitoring device 110 includes various power electronics configured to provide the required output voltages for the various components of the monitoring device 110. The power supply 224 is configured to receive input power from a power source, such as a 12V vehicle accessory voltage. To this end, the power supply 224 may connect directly to a cigarette lighter of the vehicle 102. However, in alternative embodiments, the power supply 224 may connect to a USB jack of the vehicle 102 or be directly connected to a vehicle accessory voltage line. In at least one embodiment, the power supply 224 includes a battery and includes suitable power electronics configured for drawing power from the battery, as well as for charging the battery. In this way, the power supply 224 is configured to, at least temporarily, provide power to the monitoring device 110 while the vehicle 102 is turned off or when otherwise disconnected from the power source. The power supply 224 may be operably connected to a power switch of the monitoring device 110 and configured to turn the monitoring device 110 on and off in accordance with an actuation or state of the power switch.

Figure 2F:
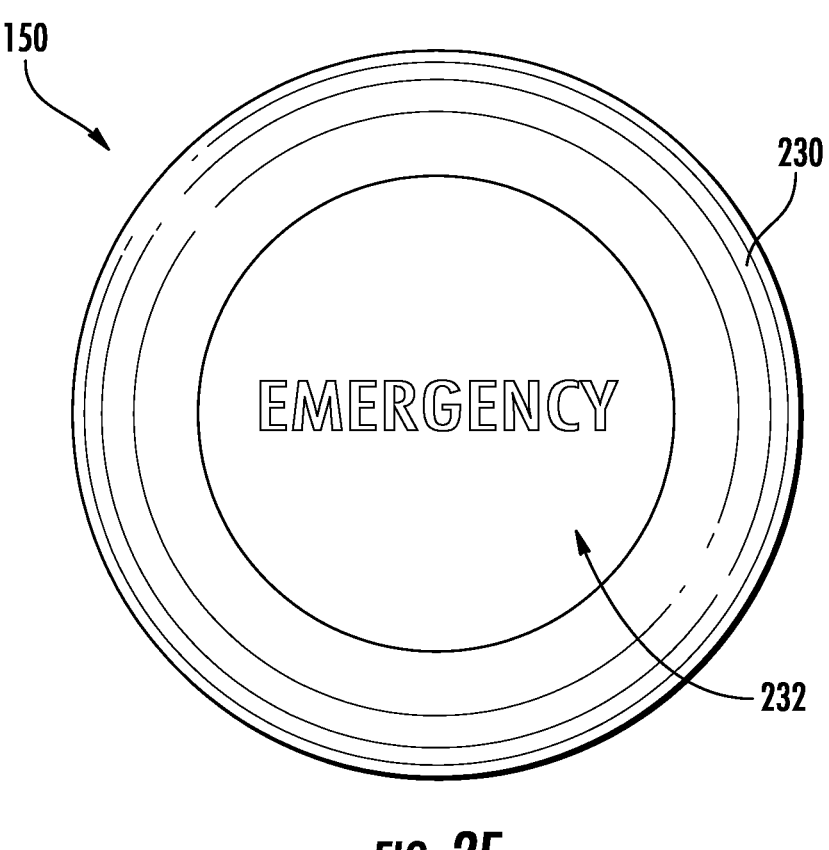
FIG. 2F shows an exemplary embodiment of the panic button of FIG. 1.
Figure 2G:
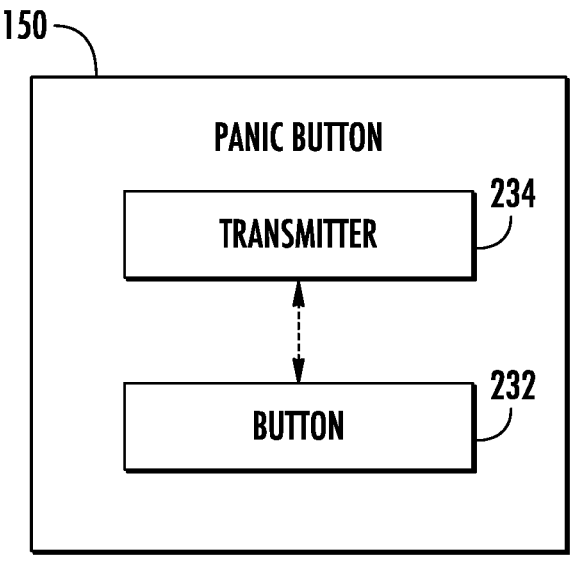
FIG. 2G shows exemplary hardware components of the panic button of FIG. 1.

Finally, with reference now to FIGS. 2F-2G, an exemplary embodiment of the panic button 150 is described. As shown in FIG. 2F, the panic button 150 includes a housing 230 having a button 232 that can be pressed by the driver or by the rider to perform some emergency function of the system 100. The button 232 may, for example, comprise a tactile mechanical button or a resistive/capacitive touch sensor. As shown in FIG. 2G, the panic button 150 further includes a transmitter 234 configured to transmit a signal to the monitoring device 110 in response to the button 232 being pressed, via a wired or wireless connection. In the wireless case, the transmitter 234 may, for example, comprise a radio transmitter.

Cloud Storage Backend and Personal Electronic Devices

Figure 3A:
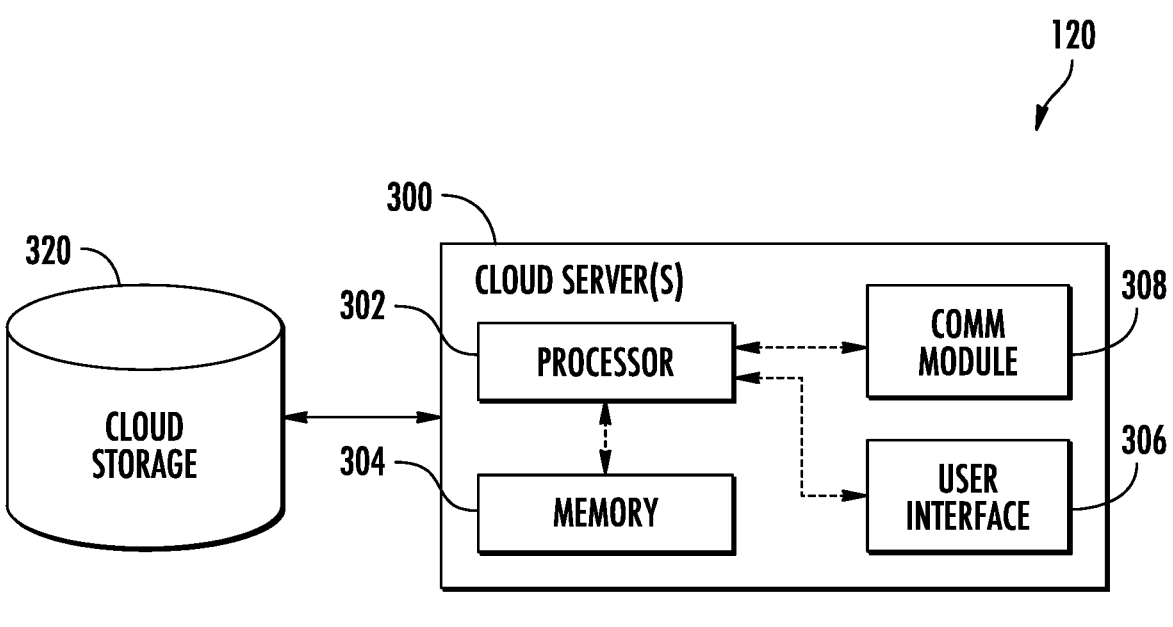
FIG. 3A shows exemplary hardware components of the cloud storage backend of FIG. 1.
Figure 3B:
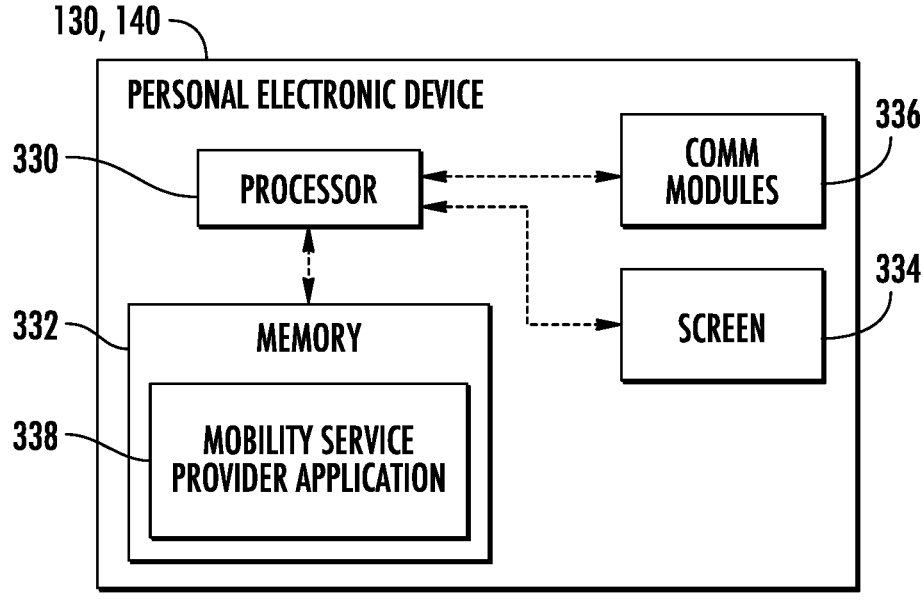
FIG. 3B shows exemplary hardware components of the personal electronic devices of FIG. 1.

With reference now to FIGS. 3A-3B, exemplary components of the cloud storage backend 120 and of the personal electronic devices 130, 140 are described. It will be appreciated that the components of the cloud storage backend 120 and of the personal electronic devices 130, 140 shown and described herein are merely exemplary and that the cloud storage backend 120 and the personal electronic devices 130, 140 may comprise any alternative configuration.

As shown in FIG. 3A, the exemplary embodiment of the cloud storage backend 120 comprises one or more cloud servers 300 and one or more cloud storage devices 320. The cloud servers 300 may include servers configured to serve a variety of functions for the cloud storage backend, including web servers or application servers depending on the features provided by cloud storage backend 120, but at least include one or more database servers configured to manage ride data received from the monitoring device 110 and stored in the cloud storage devices 320. Each of the cloud servers 300 includes, for example, a processor 302, a memory 304, a user interface 306, and a network communications module 308. It will be appreciated that the illustrated embodiment of the cloud servers 300 is only one exemplary embodiment of a cloud server 300 and is merely representative of any of various manners or configurations of a personal computer, server, or any other data processing systems that are operative in the manner set forth herein.

The processor 302 is configured to execute instructions to operate the cloud servers 300 to enable the features, functionality, characteristics and/or the like as described herein. To this end, the processor 302 is operably connected to the memory 304, the user interface 306, and the network communications module 308. The processor 302 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 302 may include a system with a central processing unit, graphics processing units, multiple processing units, dedicated circuitry for achieving functionality, programmable logic, or other processing systems.

The cloud storage devices 320 are configured to store ride data received from the monitoring device 110. The cloud storage devices 320 may be of any type of long-term non-volatile storage device capable of storing information accessible by the processor 302, such as hard drives or any of various other computer-readable storage media recognized by those of ordinary skill in the art. Likewise, the memory 304 is configured to store program instructions that, when executed by the processor 302, enable the cloud servers 300 to perform various operations described herein, including managing the ride data stored in the cloud storage devices 320. The memory 304 may be of any type of device or combination of devices capable of storing information accessible by the processor 302, such as memory cards, ROM, RAM, hard drives, discs, flash memory, or any of various other computer-readable media recognized by those of ordinary skill in the art.

The network communications module 308 of the cloud servers 300 provides an interface that allows for communication with any of various devices, at least including the monitoring device 110. In particular, the network communications module 308 may include a local area network port that allows for communication with any of various local computers housed in the same or nearby facility. Generally, the cloud servers 300 communicate with remote computers over the Internet via a separate modem and/or router of the local area network. Alternatively, the network communications module 308 may further include a wide area network port that allows for communications over the Internet. In one embodiment, the network communications module 308 is equipped with a Wi-Fi transceiver or other wireless communications device. Accordingly, it will be appreciated that communications with the cloud servers 300 may occur via wired communications or via the wireless communications. Communications may be accomplished using any of various known communications protocols.

The cloud servers 300 may be operated locally or remotely by an administrator. To facilitate local operation, the cloud servers 300 may include a user interface 306. In at least one embodiment, the user interface 306 may suitably include an LCD display screen or the like, a mouse or other pointing device, a keyboard or other keypad, speakers, and a microphone, as will be recognized by those of ordinary skill in the art. Alternatively, in some embodiments, an administrator may operate the cloud servers 300 remotely from another computing device which is in communication therewith via the network communications module 308 and has an analogous user interface.

The cloud storage backend 120 is configured to store and manage the ride data on the cloud storage devices 320 in a secure way and provide access to the ride data to the mobility service provider, as well as authorized third parties, via a web interface or API that includes controlled access and identity management. To this end, in at least some embodiments, the cloud storage backend 120 is in bi-directional communication with a backend server of the mobility service provider.

As shown in FIG. 3B, the exemplary embodiment of the personal electronic devices 130, 140 comprises a processor 330, a memory 332, a display screen 334, and at least one network communications module 336. The processor 330 is configured to execute instructions to operate the personal electronic device 130, 140 to enable the features, functionality, characteristics and/or the like as described herein. To this end, the processor 330 is operably connected to the memory 332, the display screen 334, and the network communications module 336. The processor 330 generally comprises one or more processors which may operate in parallel or otherwise in concert with one another. It will be recognized by those of ordinary skill in the art that a "processor" includes any hardware system, hardware mechanism or hardware component that processes data, signals or other information. Accordingly, the processor 330 may include a system with a central processing unit, graphics processing units, multiple processing units, dedicated circuitry for achieving functionality, programmable logic, or other processing systems.

The memory 332 is configured to store data and program instructions that, when executed by the processor 330, enable the personal electronic device 130, 140 to perform various operations described herein. The memory 332 may be of any type of device capable of storing information accessible by the processor 330, such as a memory card, ROM, RAM, hard drives, discs, flash memory, or any of various other computer-readable medium serving as data storage devices, as will be recognized by those of ordinary skill in the art. Among other things, the memory 332 stores a mobility service provider application 338. As discussed in further detail below, the processor 330 is configured to execute program instructions of the mobility service provider application 338 to provide mobility services, as discussed elsewhere herein.

The display screen 334 may comprise any of various known types of displays, such as LCD or OLED screens. In some embodiments, the display screen 334 may comprise touch screens configured to receive touch inputs from a user. Alternatively or in addition, the personal electronic device 130, 140 may include additional user interfaces, such as buttons, switches, a keyboard or other keypad, speakers, and a microphone.

The network communications module 336 may comprise one or more transceivers, modems, processors, memories, oscillators, antennas, or other hardware conventionally included in a communications module to enable communications with various other devices, at least including the monitoring device 110. Particularly, the network communications module 336 generally includes a Bluetooth® module (not shown) configured to enable communication with the monitoring device 110. Additionally, the network communications module 336 generally includes a Wi-Fi module configured to enable communication with a Wi-Fi network and/or Wi-Fi router (not shown), as well as one or more cellular modems configured to communicate with wireless telephony networks.

The personal electronic device 130, 140 may also include a respective battery or other power source (not shown) configured to power the various components within the personal electronic device 130, 140. In one embodiment, the battery of the personal electronic device 130, 140 is a rechargeable battery configured to be charged when the personal electronic device 130, 140 is connected to a battery charger configured for use with the personal electronic device 130, 140.

Methods for Operating the System to Provide Safe Ride Hailing Experience

A variety of methods and processes are described below for operating the monitoring device 110, the cloud storage backend 120, and the personal electronic device 130, 140. In these descriptions, statements that a method, processor, and/or system is performing some task or function refers to a controller or processor (e.g., the processor 212 of the monitoring device 110, the processor 302 of the cloud storage backend 120, or the processor 330 of the personal electronic device 130, 140) executing programmed instructions stored in non-transitory computer readable storage media (e.g., the memory 214 of the monitoring device 110, the memory 304 of the cloud storage backend 120, or the memory 332 of the personal electronic device 130, 140) operatively connected to the controller or processor to manipulate data or to operate one or more components in the system 100 to perform the task or function. Additionally, the steps of the methods may be performed in any feasible chronological order, regardless of the order shown in the figures or the order in which the steps are described.

Prior to performance of the methods described below, the driver sets up the monitoring device 110 in the vehicle, for example by attaching it to the dash or windshield. The driver then pairs the monitoring device 110 with one or more of the driver's personal electronic device 130, the cloud storage backend 120, and the server backend of the mobility service provider. To this end, the processor 212 of the monitoring device 110 may operate, for example, a Bluetooth® module to communicatively pair with a Bluetooth® module of the personal electronic device 130 of the driver. Likewise, the processor 212 of the monitoring device 110 operates, for example, a cellular module to communicatively connect with the cloud storage backend 120 and/or the server backend of the mobility service provider. This pairing process can be achieved in a variety of known methods using one or more buttons or other user interfaces of the monitoring device 110 and of the personal electronic device 130 of the driver.

Subsequently, the driver opens the corresponding mobility service provider application 338 on his or her personal electronic device 130 to begin a driving shift, and can accept a ride request from the rider. When the monitoring device 110 is suitably paired and operational, the processor 212 operates one or more of the status indicators 206, 208, 209 to light up in manner indicating that the monitoring device 110 is operational.

Finally, it should be appreciated that, while the ride hailing methods herein are described with respect to a mobility service provider in which a human driver operates the vehicle 102 to provide rides, the methods described herein are also applicable to mobility service providers in which there is no human driver and an autonomous vehicle is operated to provide rides.

Method for Hailing and Monitoring a Ride

FIG. 4 shows a method 400 for hailing and monitoring a ride in which a vehicle will pick up a rider at a pickup location and transport the rider to a drop-off destination. The method 400 advantageously incorporates a monitoring device which is configured to monitor the ride and, if necessary, upload sensor data to a cloud storage backend for further review by an agent of the mobility service provider or of the cloud storage service provider. In this way, disputes and other issues that arise during the ride can be better resolved by the mobility service provider or appropriate authorities.

The method 400 begins with displaying, with a personal electronic device of a rider, a plurality of booking options for a ride in which a vehicle will pick up a rider at a pickup location and transports the rider to a drop-off destination (block 410). Particularly, in order to book a ride, the rider utilizes the corresponding mobility service provider application 338 on his or her personal electronic device 140. To this end, the processor 330 of the personal electronic device 140 operates the display screen 334 to display a variety of graphical user interfaces of the mobility service provider application 338. In response to a user input via the graphical user interface, the processor 330 operates the at least one network communications module 336 to request and receive a plurality of booking options from the server backend of the mobility service provider. The processor 330 operates the display screen 334 to display a graphical user interface including the plurality of booking options.

Figure 5A:
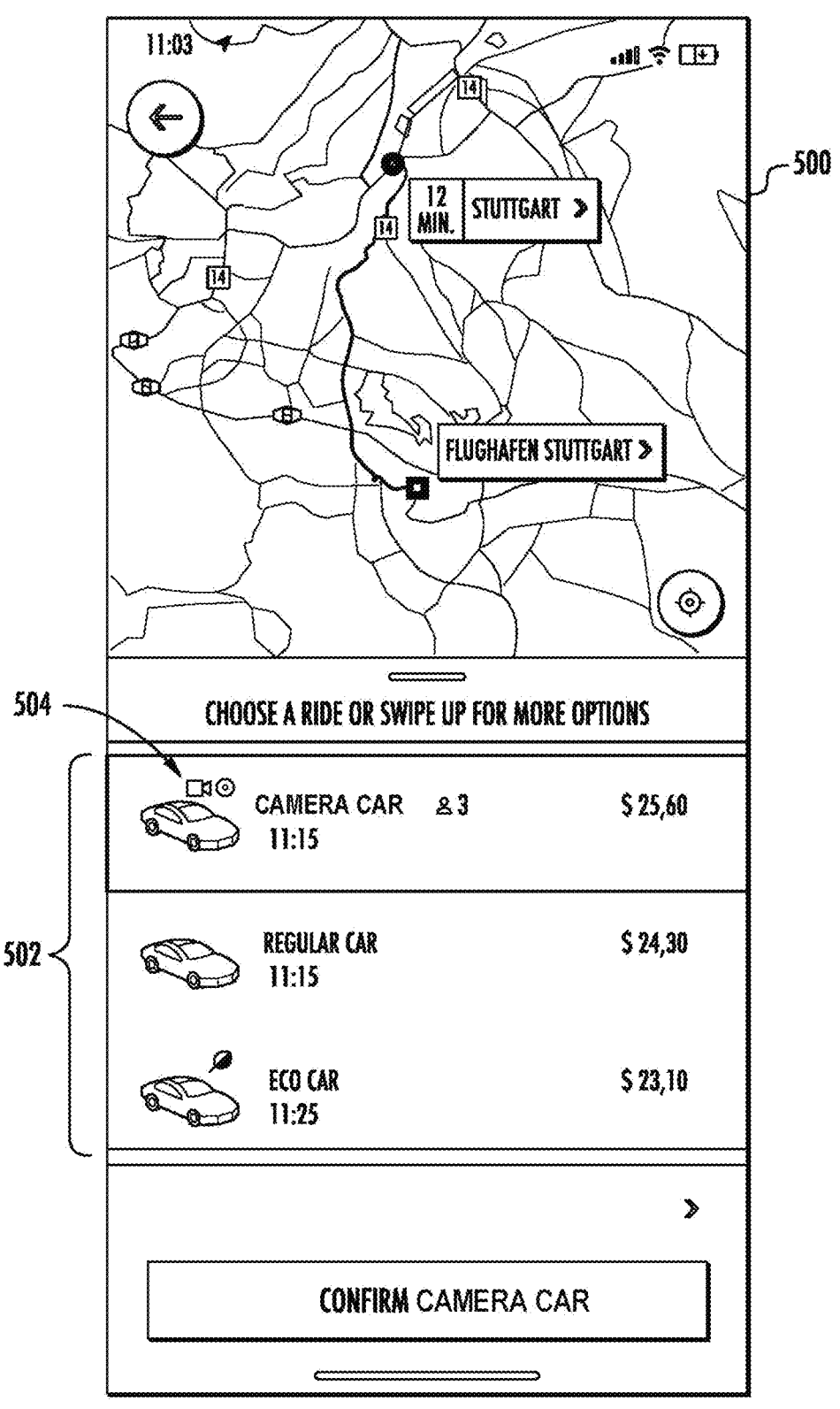
FIGS. 5A and 5B show exemplary graphical user interfaces for booking a ride of the mobility service provider.

FIG. 5A shows an exemplary graphical user interface 500 for booking a ride. The graphical user interface 500 includes a list 502 providing the plurality of booking options. Each booking option in the plurality of booking options indicates a set of features for the ride. In the illustrated example, the features for each booking option include a vehicle class (e.g. "Camera Car," "Regular Car," or "Eco Car"), arrival time (e.g., 11:15 or 11:25), and a fare (e.g., $25.60, $24.30, or $23.10). Additionally, at least one of the booking options indicates that a monitoring device 110 present in the vehicle. Booking options having a monitoring device 110 present in the vehicle are indicated, for example, by an icon 504.

Figure 5B:
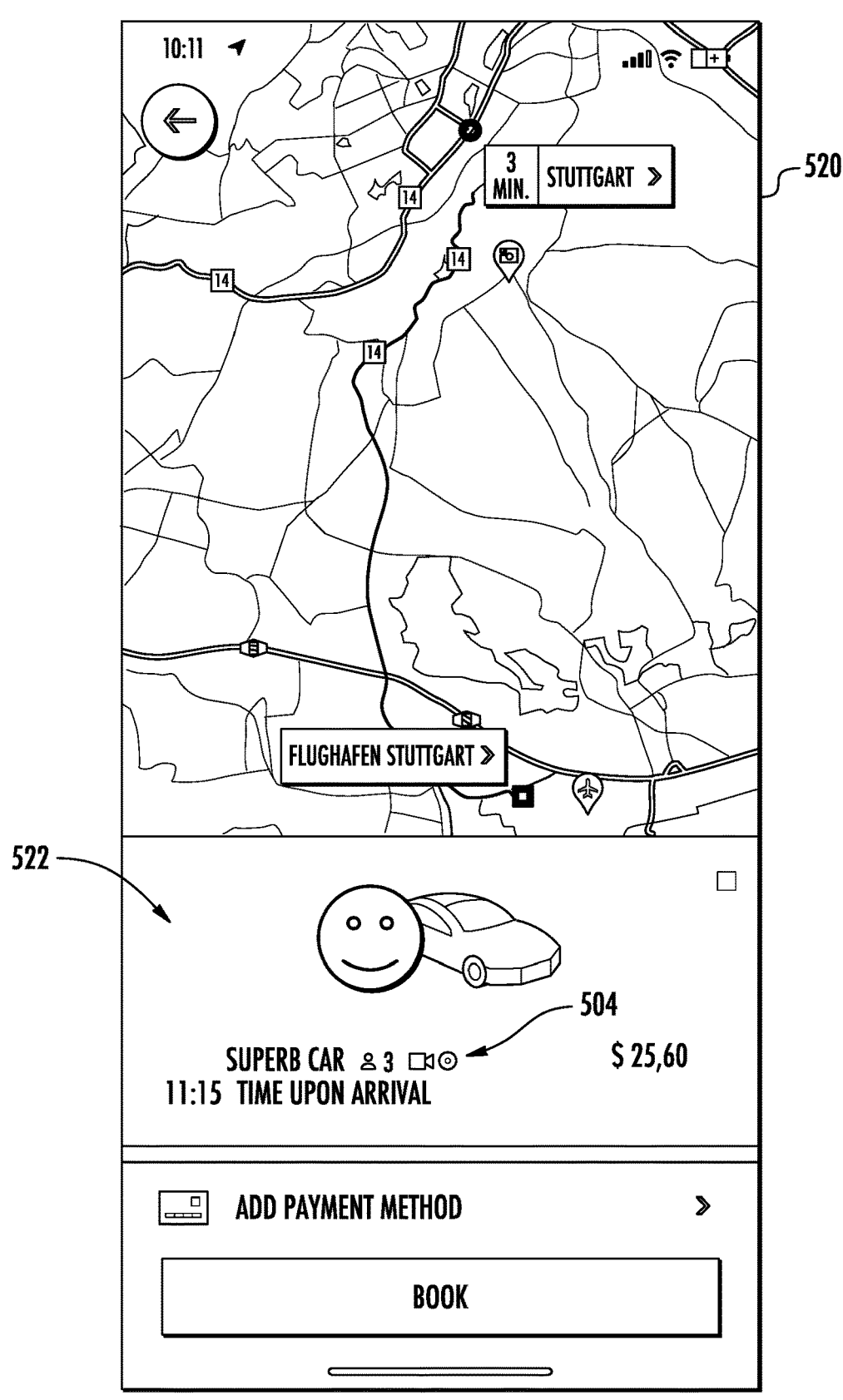

The method 400 continues with selecting, with the personal electronic device, a booking option having a feature in which a monitoring device is present in the vehicle that can capture sensor data during the ride (block 420). Particularly, based on a user input via the graphical user interface, the processor 330 selects one of the booking options from the plurality of booking options, which indicates as one of the set of features for the ride that a monitoring device 110 present in the vehicle. In one embodiment, the processor 330 operates the display screen 334 to display a further graphical user interface including a confirmation dialogue for the selected booking option. FIG. 5B shows an exemplary graphical user interface 520 having a confirmation dialogue 522 via which the rider can confirm the booking of the selected booking option in which a monitoring device 110 will be present in the vehicle. Once a booking option has been selected and confirmed, the processor 330 operates the at least one network communications module 336 to transmit a signal (e.g., a message and/or request) indicating the selected booking option to the server backend of the mobility service provider.

The method 400 continues with capturing and storing sensor data during the ride using the monitoring device (block 430). Particularly, the driver receives a ride request via the corresponding mobility service provider application 338 on his or her personal electronic device 130. Once the ride request is accepted, the driver is provided with the pickup location and he or she drives the vehicle 102 to the pickup location. Once the rider enters the vehicle 102, the driver inputs to the corresponding mobility service provider application 338 that the rider has been picked up. The processor 330 of the driver's personal electronic device 130 operates the at least one network communications module 336 to transmit a signal (e.g., a message) indicating that the rider has been picked up to the monitoring device 110 and/or to the server backend of the mobility service provider.

The processor 212 of the monitoring device 110 receives, via the one or more communication devices 218, the signal indicating that the rider has been picked up from the driver's personal electronic device 130 or from the server backend of the mobility service provider. In response to receiving the signal, the processor 212 begins operating the sensors of the monitoring device 110 to capture sensor data during the ride and storing the sensor data in the memory 214. Additionally, the processor 212 operates one or more of the status indicators, in particular the recording status indicator 208, to light up in a manner that indicates that the monitoring device 110 is recording.

The sensor data generally at least includes (i) video of the interior cabin 104 of the vehicle during the ride captured by the cabin-facing camera 114, (ii) video of an environment around the vehicle (e.g., the road ahead) during the ride captured by the exterior-facing camera 118, and (iii) audio of the interior cabin 104 of the vehicle during the ride captured by the microphone 116. However, the sensor data may also include data from any of the additional sensors described herein, such as GPS position data, inertial sensor data, temperature data, airborne particle data, air-quality data, and/or other environmental data.

Once the rider has been dropped off at the drop-off destination, the driver inputs to the corresponding mobility service provider application 338 that the rider has been dropped off. The processor 330 of the driver's personal electronic device 130 operates the at least one network communications module 336 to transmit a signal (e.g., a message) indicating that the rider has been dropped off to the monitoring device 110 and/or to the server backend of the mobility service provider. The processor 212 of the monitoring device 110 receives, via the one or more communication devices 218, the signal indicating that the rider has been dropped off from the driver's personal electronic device 130 or from the server backend of the mobility service provider. In some cases, depending on driver preferences, in response to receiving the signal, the processor 212 ceases operating the sensors of the monitoring device 110 to capture the sensor data and ceases storing the sensor data in the memory 214. Additionally, the processor 212 operates one or more of the status indicators, in particular the recording status indicator 208, to turn off or otherwise operate in a manner that indicates that the monitoring device 110 is no longer recording.

The method 400 continues with receiving, with the monitoring device from a remote server, an upload request for the sensor data captured during the ride (block 440). Particularly, after the rider has been dropped off at the drop-off destination, the rider and the driver can each request that the sensor data captured during the ride be uploaded to the cloud storage backend 120 for review by an agent of the mobility service provider or of the cloud storage service provider. To this end, the processor 330 of the rider's or driver's personal electronic device 140, 130 operates the display screen 334 to display a graphical user interface including an option to request upload of the sensor data captured during the ride. In response to user inputs from the rider or driver via the graphical user interface, the processor 330 operates the at least one network communications module 336 to transmit, to the cloud storage backend 120 or to the server backend of the mobility service provider, a request (e.g., a message) that the sensor data captured during the ride be uploaded to the cloud storage backend 120.

Figure 5C:
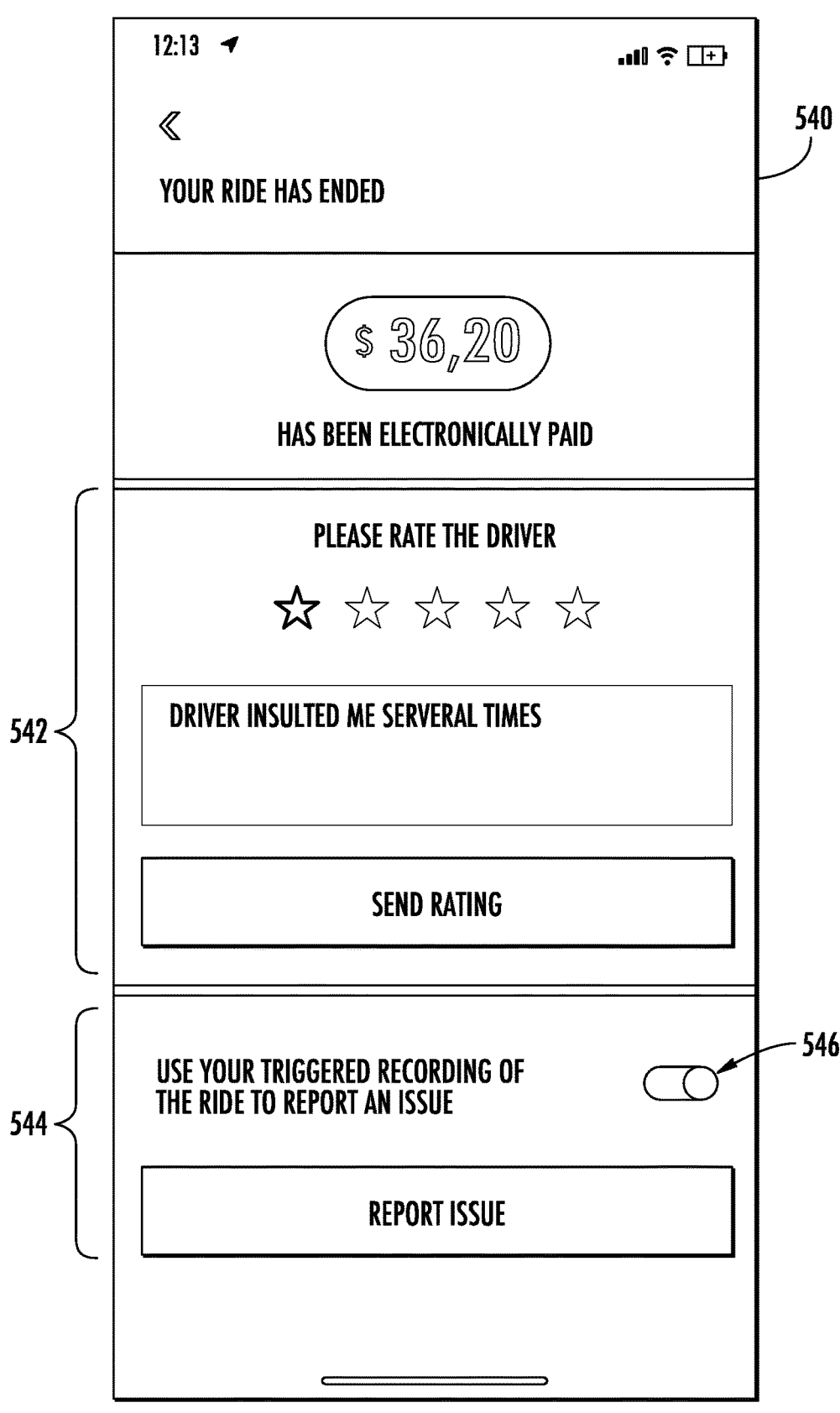
FIG. 5C shows an exemplary graphical user interface for rating the driver and reporting any issues.

FIG. 5C shows an exemplary graphical user interface 540 provided to the rider for rating the driver and reporting any issues. The graphical user interface 540 includes a driver rating menu 542 via which the rider can provide a numerical rating (e.g., one star out of five) and a text rating (e.g., "Driver insulted me several times"). Additionally, the graphical user interface 540 includes an issue reporting menu 544 via which the rider can report to the mobility service provider that there was an issue during the ride. The rider can operate a virtual toggle 546 of the issue reporting menu 544 to indicate whether the sensor data captured during the ride should be uploaded to the cloud storage backend 120.

In response to receiving the request from the rider or driver that the sensor data captured during the ride be uploaded, the cloud storage backend 120 or the server backend of the mobility service provider transmits a request (e.g., a message) to the monitoring device 110 to upload the sensor data captured during the ride to the cloud storage backend 120. The processor 212 of the monitoring device 110 receives, via the one or more communication devices 218, the request to upload the sensor data captured during the ride from the server backend of the mobility service provider or from the cloud storage backend 120.

It should be appreciated, however, that in some cases, an upload request may occur while the ride is still in progress, which results in a live upload and/or streaming of the sensor data captured during the ride to the cloud storage backend 120. Upload can occur during a ride, for example, if a rider or driver triggers an emergency alert while a ride is in progress (as discussed below). The live upload can be reviewed in "real-time" by a service agent who may intervene or call emergency response services (i.e., police, ambulance, etc.).

The method 400 continues with a step of uploading, from the monitoring device to the remote server, the sensor data captured during the ride (block 450). Particularly, in response to receiving the request to upload the sensor data captured during the ride, the processor 212 operates the one or more communication devices 218 to upload the sensor data captured during the ride to the cloud storage backend 120. Upon receipt, the sensor data is stored in the cloud storage 320 of the cloud storage backend 120 and is made available for review by an agent of the mobility service provider or of the cloud storage service provider.

Method for User Control of Ride Monitoring

FIG. 6 shows a method 600 enabling user control of whether sensor data is captured by a monitoring device during a ride. The method 600 advantageously provides the user with understanding and control of how the monitoring device 110 is operated to monitor rides. In this way, the comfort and confidence of the user with respect to the monitoring device 110 and with the mobility service provider is enhanced.

The method 600 is described below with respect to a scenario in which the rider can control whether sensor data is captured by the monitoring device during a ride. However, it should be appreciated that the method 600 can be equivalently applied for the driver. Moreover, in many embodiments, neither the rider nor the driver has complete control over whether sensor data is captured by the monitoring device during a ride. For example, depending on the policies of the mobility service provider, sensor data may be captured by the monitoring device during a ride if either of the rider or driver request that it is captured, such that neither party can unilaterally disable the monitoring device. It should be appreciated that the mobility service provider may have diverse policies in this regard.

The method 600 begins with selecting, with the personal electronic device, whether sensor data should be captured during the ride (block 610). Particularly, prior to booking a ride, the rider can customize how the monitoring device 110 is utilized during the ride. To this end, the processor 330 of the rider's personal electronic device 140 operates the display screen 334 to display one or more graphical user interfaces which describe and allow customization of the available operations of the monitoring device 110. The graphical user interfaces at least include options to select whether or not sensor data, or particular types of sensor data, should be captured during the ride.

In at least one embodiment, based on a user input from the rider via the graphical user interface, the processor 330 selects whether the monitoring device will capture and store video from the cabin-facing camera 114 during the ride. In at least one embodiment, based on a user input from the rider via the graphical user interface, the processor 330 selects whether the monitoring device will capture and store audio from the microphone 116 during the ride. Additionally, the graphical user interfaces may also allow for rider selections with respect to the other sensors of the monitoring device 110, including the external-facing camera 118 and any of the additional sensors 216.

In response to user inputs from the rider via the graphical user interfaces, the processor 330 operates the at least one network communications module 336 to transmit, to the cloud storage backend 120 or to the server backend of the mobility service provider, a signal (e.g., a message) indicating the selections of whether sensor data should be captured from the various sensors of the monitoring device 110.

Figure 7A:
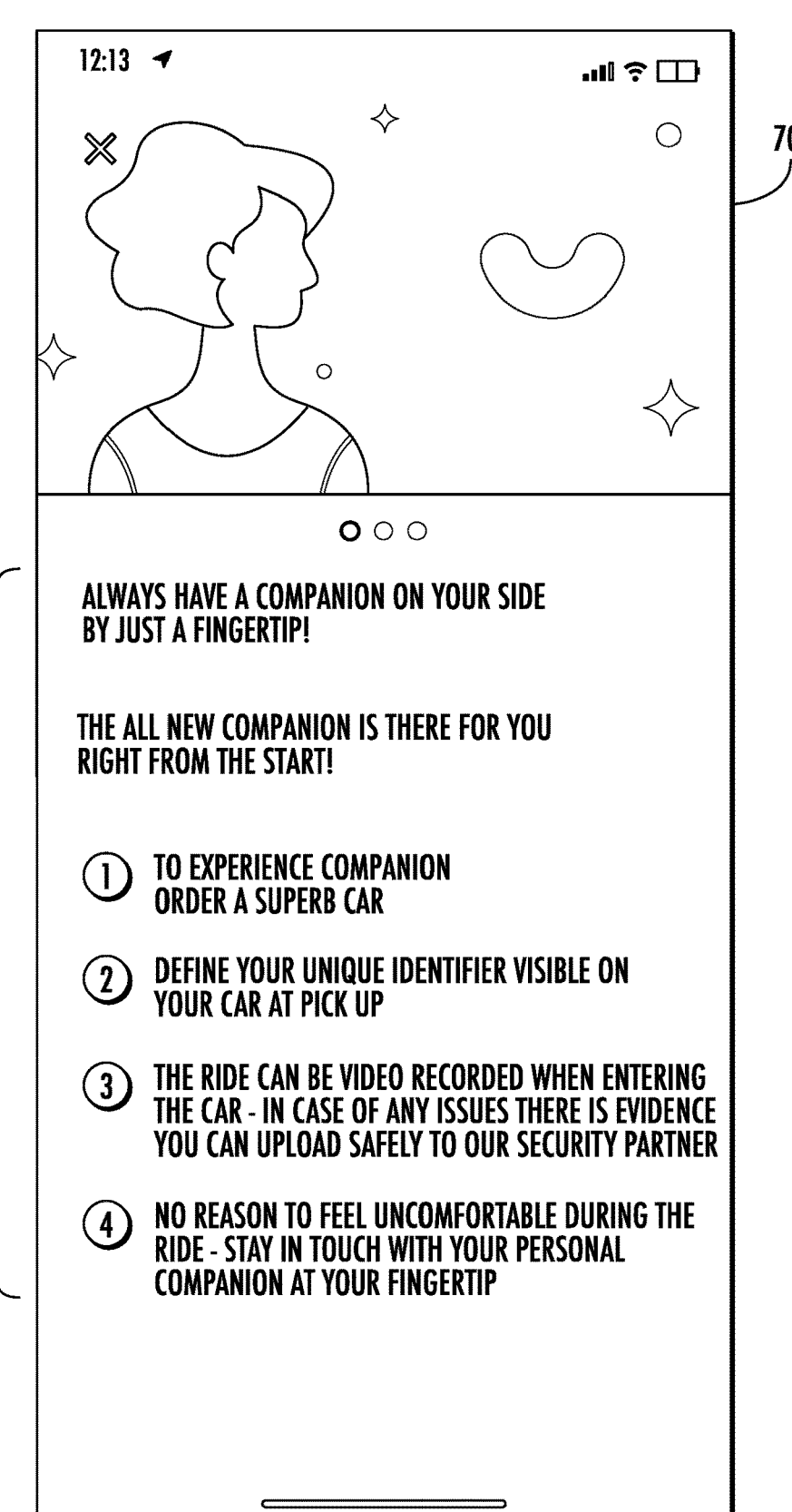
FIGS. 7A and 7B show exemplary graphical user interfaces for describing and customizing the available operations of the monitoring device.
Figure 7B:
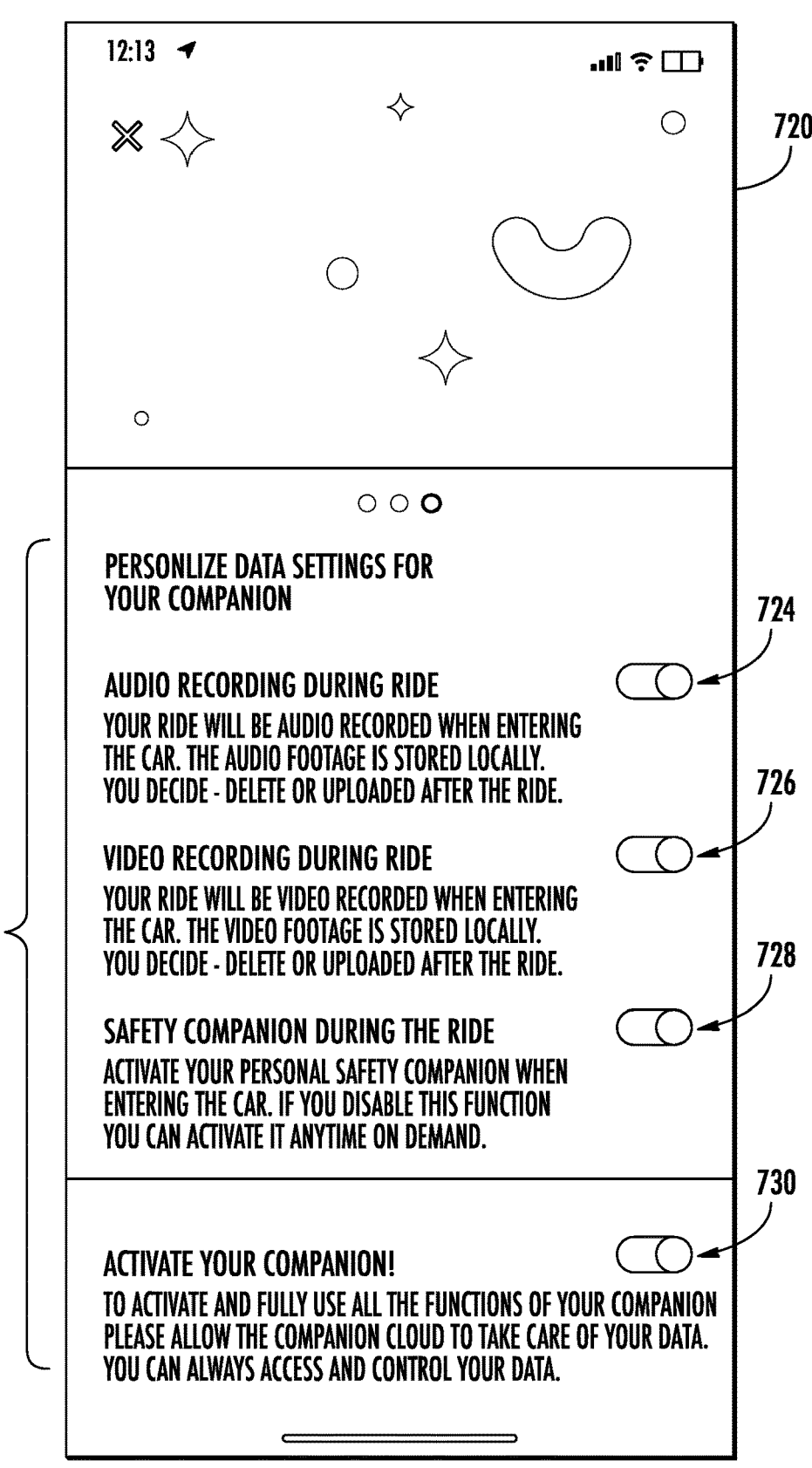

FIG. 7A shows an exemplary graphical user interface 700 including a description 702 of the available operations of the monitoring device 110 (also referred to as the "Companion"). FIG. 7B shows an exemplary graphical user interface 720 including a recording options menu 722 via which the rider can select various options for the operation of the monitoring device 110 during rides. The rider can operate a virtual toggle 724 of the recording options menu 722 to indicate whether audio (e.g., from the microphone 116) should be recorded during the ride. The rider can operate a virtual toggle 726 of the recording options menu 722 to indicate whether video (e.g., from one or both of the cabin-facing camera 114 and the exterior-facing 118) should be recorded during the ride. The rider can operate a virtual toggle 728 of the recording options menu 722 to indicate whether sensor data should begin recording immediately upon the rider entering the car. Finally, the rider can operate a virtual toggle 730 of the recording options menu 722 to indicate whether the rider authorizes the monitoring device 110 to be activated at all during rides.

The method 600 continues with receiving, with the monitoring device from a remote server, the selection of whether sensor data should be captured during the ride (block 620). Particularly, the cloud storage backend 120 or the server backend of the mobility service provider receives the signal indicating the selections of whether sensor data should be captured from the various sensors of the monitoring device 110 and transmits a corresponding control signal (e.g., a message) to the monitoring device 110. The processor 212 of the monitoring device 110 receives, via the one or more communication devices 218, the control signal from the cloud storage backend 120 or from the server backend of the mobility service provider. The control signal indicates whether sensor data should be captured from the various sensors of the monitoring device 110.

The method 600 continues with capturing and storing sensor data during the ride using the monitoring device, in response to a selection that sensor data is to be captured during the ride (block 630). Particularly, in response to (i) receiving the control signal from the cloud storage backend 120 or from the server backend of the mobility service provider and (ii) the control signal indicating that at least some sensor data should be recorded, the monitoring device 110 begins capturing and storing sensor data as indicated by the control signal. If the control signal indicates that sensor data should begin recording immediately upon the rider entering the vehicle 102 (i.e., the rider set the virtual toggle 728 to 'on'), then in response to receiving a signal indicating that the rider has entered the vehicle 102, the processor 212 operates one or more of the sensors of the monitoring device 110 to capture the sensor data during the ride and store the sensor data in the memory 214. In response to the control signal indicating that audio data should be recorded during the ride (i.e., the rider set the virtual toggle 724 to 'on'), the processor 212 operates the microphone 116 to capture audio data during the ride and store the audio data in the memory 214. Likewise, in response to the control signal indicating that video data should be recorded during the ride (i.e., the rider set the virtual toggle 726 to 'on'), the processor 212 operates one or both of the cabin-facing camera 114 and the exterior-facing camera 118 to capture video data during the ride and store the video data in the memory 214.

The method 600 continues with disabling the capture or storage of the sensor data during the ride by the monitoring device, in response to a selection that sensor data is not to be captured during the ride (block 640). Particularly, in response to (i) receiving the control signal from the cloud storage backend 120 or from the server backend of the mobility service provider and (ii) the control signal indicating that sensor data or a specified type of sensor data should be not recorded, the monitoring device 110 disables the capture or storage of the sensor data or the specified type of sensor data. More particularly, in response to the control signal indicating that audio data should not be recorded during the ride (i.e., the rider set the virtual toggle 724 to 'off'), the processor 212 disables the microphone 116 or disables the storage of audio data received therefrom in the memory 214. Likewise, in response to the control signal indicating that video data should not be recorded during the ride (i.e., the rider set the virtual toggle 726 to 'off'), the processor 212 disables one or both of the cabin-facing camera 114 and the exterior-facing camera 118 or disables the storage of video data received therefrom in the memory 214. Finally, in response to the control signal indicating that sensor data should not begin recording immediately upon the rider entering the car (i.e., the rider set the virtual toggle 728 to 'off'), the processor 212 disables all of the sensors or disables storage of any sensor data in the memory 214, until receiving a further control signal indicating that at least some sensor data should be recorded for the ride.

Method for Interactive Ride Pickup

FIG. 8 shows a method 800 for providing interactive ride pick up for a ride in which a driver of a vehicle picks up a rider at a pickup location and drives the rider to a drop off destination. The method 800 advantageously incorporates a monitoring device having an external beacon which displays, at least during pickup of the rider, a welcome graphic that is customizable by the rider. In this way, the rider can more easily and confidently identify the driver's vehicle during the pickup process.

The method 800 begins with configuring, with a personal electronic device of a rider, a customized graphic to be displayed by a monitoring device during a pickup of the rider (block 810). Particularly, prior to booking a ride, the rider can customize a welcome graphic that is to be displayed on the exterior-facing beacon 112 during pickup. To this end, the processor 330 of the rider's personal electronic device 140 operates the display screen 334 to display one or more graphical user interfaces via which the rider can customize the welcome graphic. In the illustrated embodiments, the welcome graphic consists of a customized text string or "welcome ID" (e.g., "SAM!") having a predetermined number of characters (e.g., four characters) and customized color or shape (e.g., using a color wheel selection tool) that is, in particular, applied as a background to the text string or as a color of the text string. To this end, the graphical user interfaces at least include options to (1) customize the text string and (2) customize a color of the text string or the background color/shape.

Figure 9A:
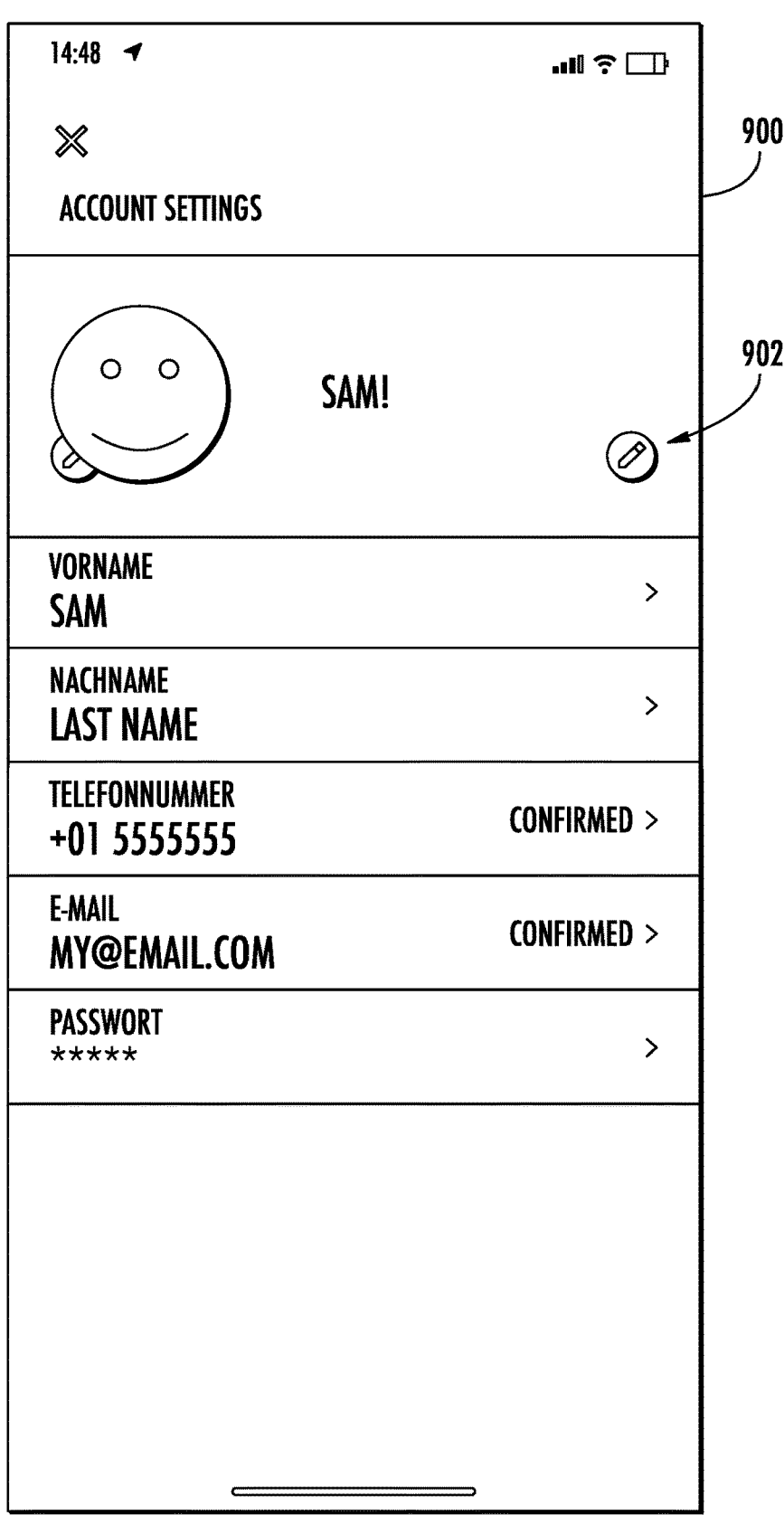

FIG. 9A shows an exemplary graphical user interface 900 for adjusting account settings. The graphical user interface 900 includes a welcome graphic customization option 902 that can be selected to customize the welcome graphic. FIG. 9B shows an exemplary graphical user interface 920 for customizing the welcome graphic and which is accessed by selecting the welcome graphic customization option 902 of the graphical user interface 900. The graphical user interface 920 includes a color wheel 922 that is operated by the rider to select a custom color that is to be used as a background to the welcome graphic or as a color of the text string. Additionally, the graphical user interface 920 includes a text box 924 in which the rider can type a custom text string or "welcome ID" that is to be used in the welcome graphic.

In response to user inputs from the rider via the graphical user interfaces, the processor 330 operates the at least one network communications module 336 to transmit, to the cloud storage backend 120 or to the server backend of the mobility service provider, a signal (e.g., a message) indicating the customizations to of the welcome graphic.

The method 800 continues with receiving, with the monitoring device in a vehicle of the driver, the customized graphic (block 820). Particularly, the cloud storage backend 120 or the server backend of the mobility service provider receives the signal indicating the customizations of the welcome graphic and transmits a corresponding control signal (e.g., a message) to the monitoring device 110. The processor 212 of the monitoring device 110 receives, via the one or more communication devices 218, the control signal from the cloud storage backend 120 or from the server backend of the mobility service provider. The control signal includes data indicating the customizations of the welcome graphic by the rider.

The method 800 continues with displaying, as the driver picks up the rider at the pickup location, the customized graphic on an exterior-facing display beacon of the monitoring device (block 830). Particularly, prior to the vehicle picking up the rider at the pickup location, the processor 212 of the monitoring device 110 operates the exterior-facing beacon 112 to display the welcome graphic in accordance with the customizations indicated in the received control signal. That is to say, in the illustrated examples, the exterior-facing beacon 112 is operated to display the custom text string with the custom color applied to a background, the text string itself, or another portion of the welcome graphic, as previously configured by the rider.

In general, the monitoring device 110 displays the welcome graphic on the exterior-facing beacon 112 shortly before the vehicle 102 arrives at the pickup location to pick up the rider. In this way, the rider can more easily and confidently identify the driver's vehicle during the pickup process. In one embodiment, the processor 212 operates the exterior-facing beacon 112 to display the welcome graphic in response to the vehicle 102 being within a predetermined distance from the pickup location. In one embodiment, the processor 212 operates the exterior-facing beacon 112 to display the welcome graphic in response to the vehicle 102 being within a predetermined travel time from the pickup location.

Figure 9C:
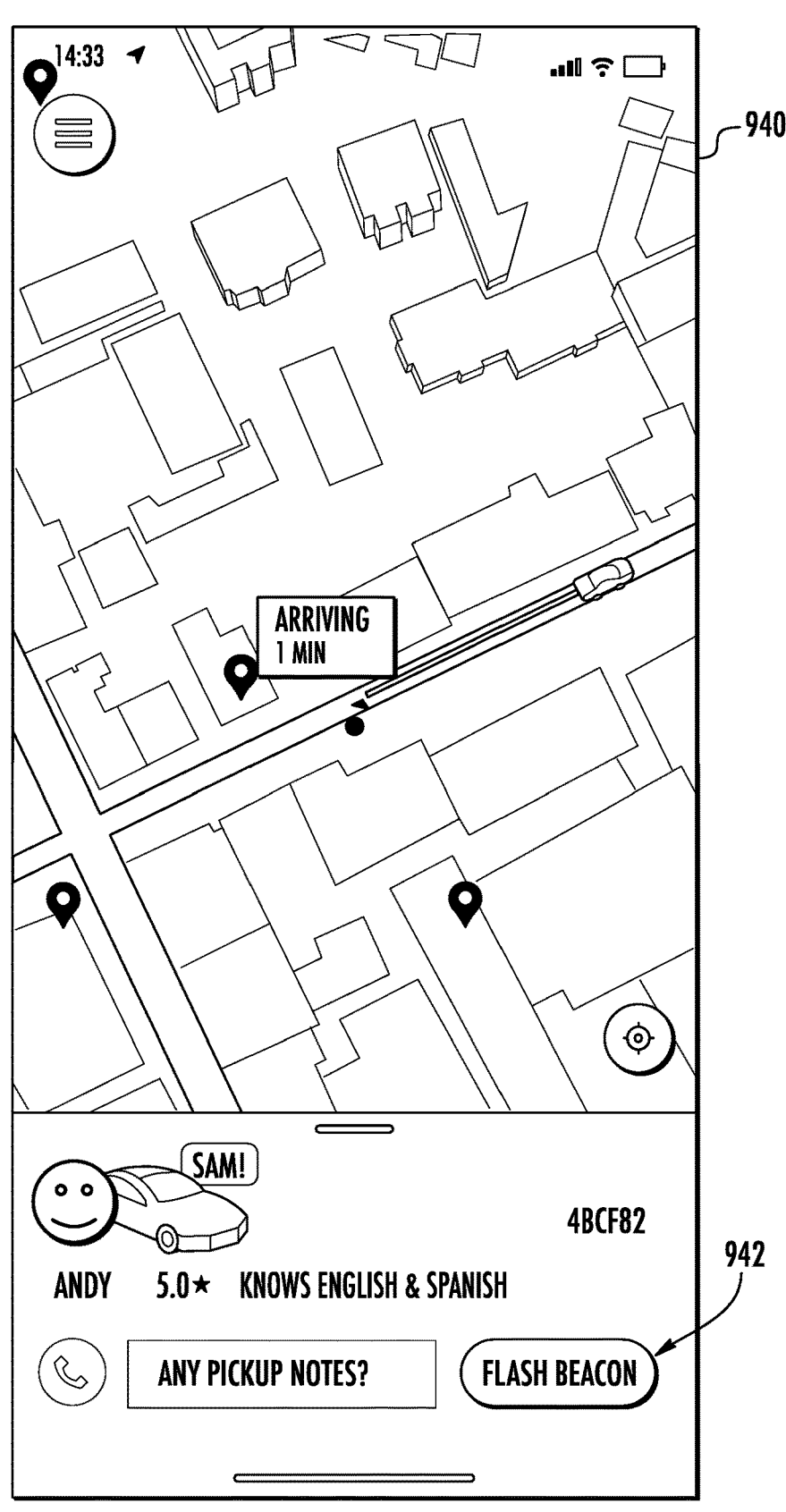
FIG. 9C shows an exemplary graphical user interface for monitoring a progress of the vehicle during pickup.

The method 800 optionally continues with requesting, with the personal electronic device, a flashing of the customized graphic (block 840). Particularly, as the rider is awaiting the arrival of the vehicle 102 at the pickup location, the rider can optionally request that the monitoring device 110 flash or otherwise modulate the welcome graphic temporarily, to make the vehicle 102 more easy to identify. To this end, the processor 330 of the rider's personal electronic device 140 operates the display screen 334 to display a graphical user interface via which the rider can request that the welcome graphic is flashed or otherwise modulated on the exterior-facing beacon 112. FIG. 9C shows an exemplary graphical user interface 940 monitoring a progress of the vehicle 102 during pickup. The graphical user interface 940 includes a flash beacon option 942 that can be selected by the rider to request that the welcome graphic is flashed or otherwise modulated on the exterior-facing beacon 112.

In response to user inputs from the rider via the graphical user interfaces, the processor 330 operates the at least one network communications module 336 to transmit, to the cloud storage backend 120 or to the server backend of the mobility service provider, a request (e.g., a message) that the welcome graphic is flashed or otherwise modulated. The cloud storage backend 120 or the server backend of the mobility service provider receives the request that the welcome graphic is flashed or otherwise modulated and transmits a corresponding request (e.g., a message) to the monitoring device 110. The processor 212 of the monitoring device 110 receives, via the one or more communication devices 218, the request from the cloud storage backend 120 or from the server backend of the mobility service provider.

The method 800 continues with flashing the customized graphic on the exterior-facing display beacon of the monitoring device (block 850). Particularly, in response to receiving the request that the welcome graphic is flashed or otherwise modulated, the processor 212 operates the exterior-facing beacon 112 to flash or otherwise modulate the welcome graphic displayed thereon. As used herein, "flash"

refers to any modulation of a brightness or color of at least a portion of the exterior-facing beacon on which the welcome graphic is displayed. FIG. 10 shows an exemplary process for flashing a welcome graphic on the exterior-facing beacon 112 of the monitoring device 110. In the illustrated example, a circular colored region 1000 (colored according to the rider's custom color) is arranged behind a text string (e.g., "SAM!"). To flash the welcome graphic, the size of the circular colored region 1000 is modulated to become larger or smaller, thereby modulating the brightness and color of the welcome graphic on the exterior-facing beacon 112

Methods for Rider Confirmation of Ride Monitoring

FIG. 11 shows a method 1100 for providing confirmation to the rider that a monitoring device is active and operational during a ride. The method 1100 advantageously provides confirmation and assurance to the rider that the monitoring device 110 is indeed operational and that the driver has not neglected to properly pair the monitoring device 110 or otherwise tampered with its operation. In this way, the confidence of the rider with respect to the monitoring device 110 and with the mobility service provider is enhanced.

The method 1100 begins with receiving, with the personal electronic device, from a remote server, a confirmation that a monitoring device is present in the vehicle and is operational (block 1110). Particularly, when a rider books a ride in which a monitoring device 110 will be utilized to record sensor data during the ride, the rider's personal electronic device 140 receives a confirmation (e.g., a message) from the cloud storage backend 120 and/or the server backend of the mobility service provider. The confirmation indicates that the monitoring device 110 is present in the vehicle 102 and is operational (e.g., properly paired to the driver's personal electronic device 140, to the cloud storage backend 120 and/or to the server backend of the mobility service provider). The cloud storage backend 120 and/or the server backend of the mobility service provider may, for example, transmit this confirmation to the rider's personal electronic device 140 during pickup of the rider or in response to the rider entering the vehicle 102. Alternatively, the cloud storage backend 120 and/or the server backend of the mobility service provider transmit the confirmation to the rider's personal electronic device 140 immediately or shortly after the rider books the ride.

The method 1100 continues with displaying, with the personal electronic device, in response to receiving the confirmation, a graphical element indicating that the monitoring device is present in the vehicle and is operational (block 1120). Particularly, at an appropriate time, in response to or after receiving the confirmation, the rider's personal electronic device 140 is configured to display a graphical element or graphical confirmation, such as a notification, indicating that the monitoring device 110 is present in the vehicle 102 and is operational. To this end, the processor 330 of the rider's personal electronic device 140 operates the display screen 334 to display one or more graphical user interfaces via which the graphical element or graphical confirmation is displayed. In one embodiment, the processor 330 operates the display screen 334 to display the graphical element or graphical confirmation in response to or after the rider enters the vehicle 102 (the confirmation may have been received by the rider's personal electronic device at an earlier time). In one embodiment, the processor 330 operates the display screen 334 to display the graphical element or graphical confirmation in response to or after the vehicle 102 is a predetermined distance or travel time from the pickup location (the confirmation may have been received by the rider's personal electronic device at an earlier time).

Figure 12A:
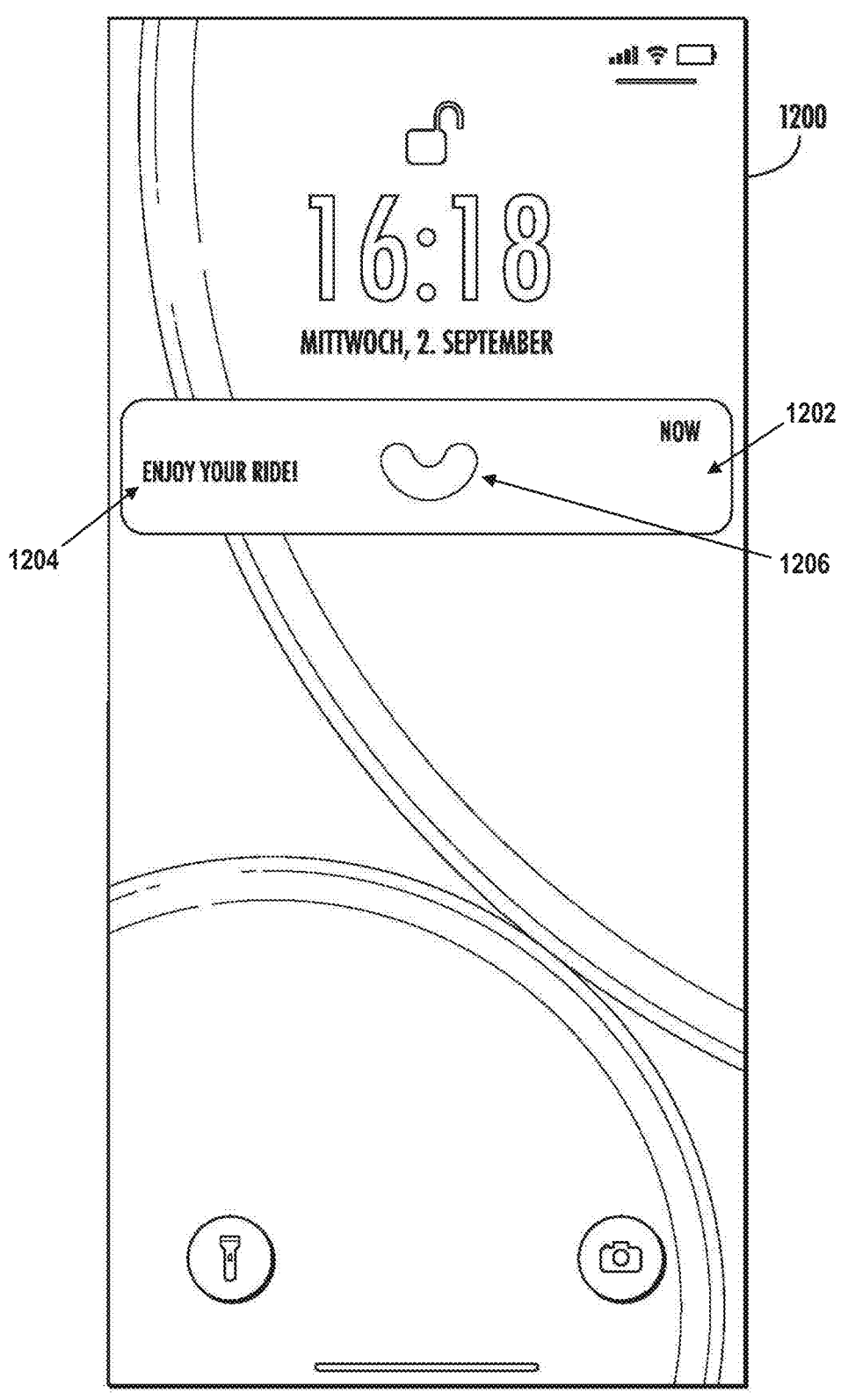
FIGS. 12A and 12B show exemplary graphical user interfaces for providing a monitoring confirmation notification.
Figure 12B:
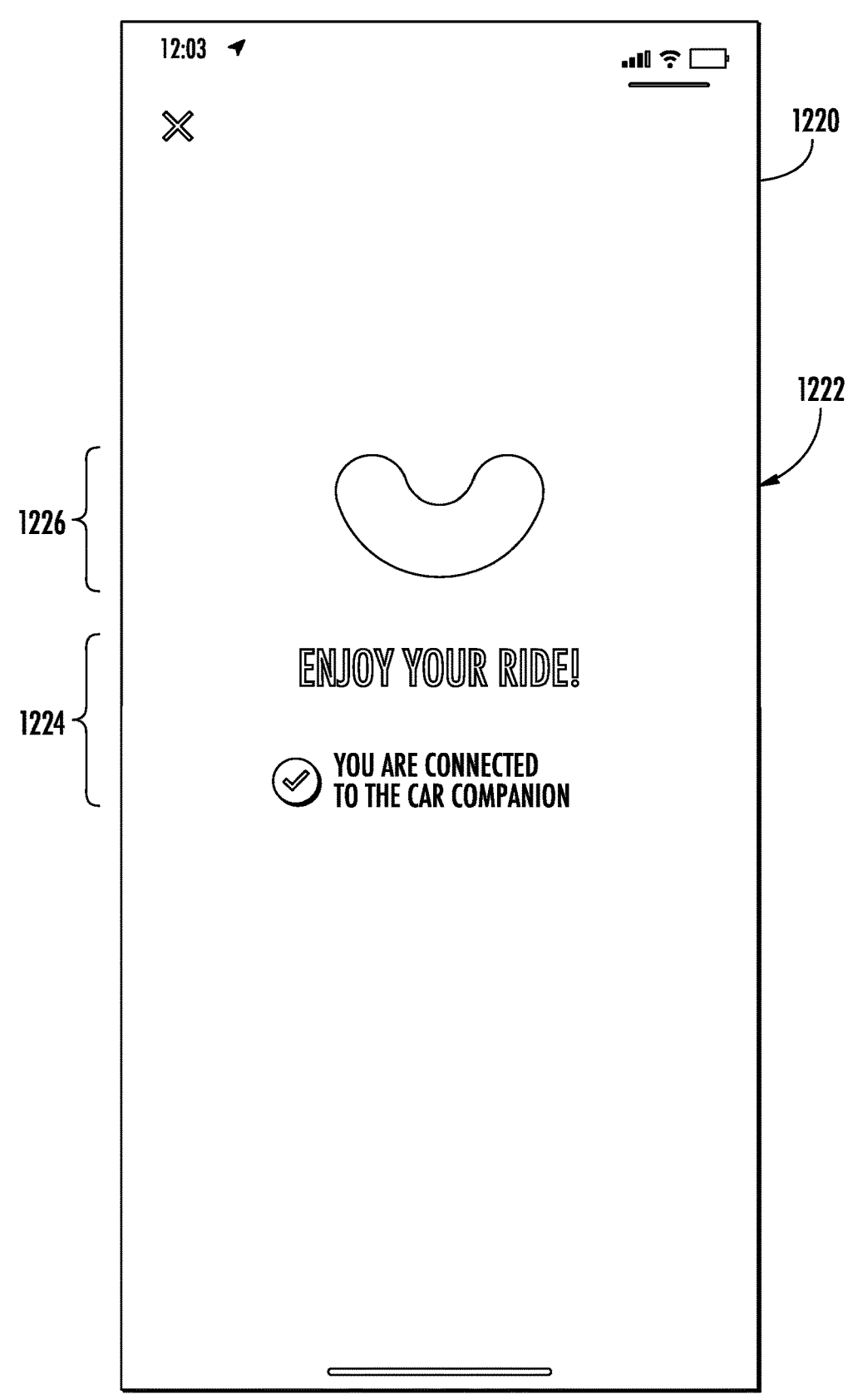

In some embodiments, the graphical element or graphical confirmation comprises one or both of (i) an operating system notification received via the corresponding mobility service provider application 338 and (ii) an in-application notification of the corresponding mobility service provider application 338. FIG. 12A shows an exemplary graphical user interface 1200 having an operating system notification 1202. The operating system notification 1202 includes text 1204 (e.g., "Enjoy your ride!") and an image 1206 (e.g., a half-circle of green light, which is similar to that of the information light 206 in FIG. 2C) providing confirmation that the monitoring device 110 is present in the vehicle 102 and is operational. FIG. 12B shows an exemplary graphical user interface 1220 having an in-application notification 1222. The in-application notification 1222 includes text 1224 (e.g., "Enjoy your ride!" and "You are connected to the car companion") and an image 1226 (e.g., a half-circle of green light, which is similar to that of the information light 206 in FIG. 2C) providing confirmation that the monitoring device 110 is present in the vehicle 102 and is operational.

The method 1100 optionally continues with requesting, with the personal electronic device, a visual confirmation by the monitoring device (block 1130). Particularly, during the ride, the rider can optionally request that the monitoring device 110 displays a visual confirmation that it is operational and suitably connected/paired (e.g., with one or more of the cloud storage backend 120, the server backend of the mobility service provider, and the driver's personal electronic device 130). To this end, the processor 330 of the rider's personal electronic device 140 operates the display screen 334 to display a graphical user interface via which the rider can request that the monitoring device 110 displays a visual confirmation. In response to a user input from the rider via the graphical user interface, the processor 330 operates the at least one network communications module 336 to transmit, to the cloud storage backend 120 and/or the server backend of the mobility service provider, a request (e.g., a message) that the monitoring device 110 displays a visual confirmation.

Figure 13A:
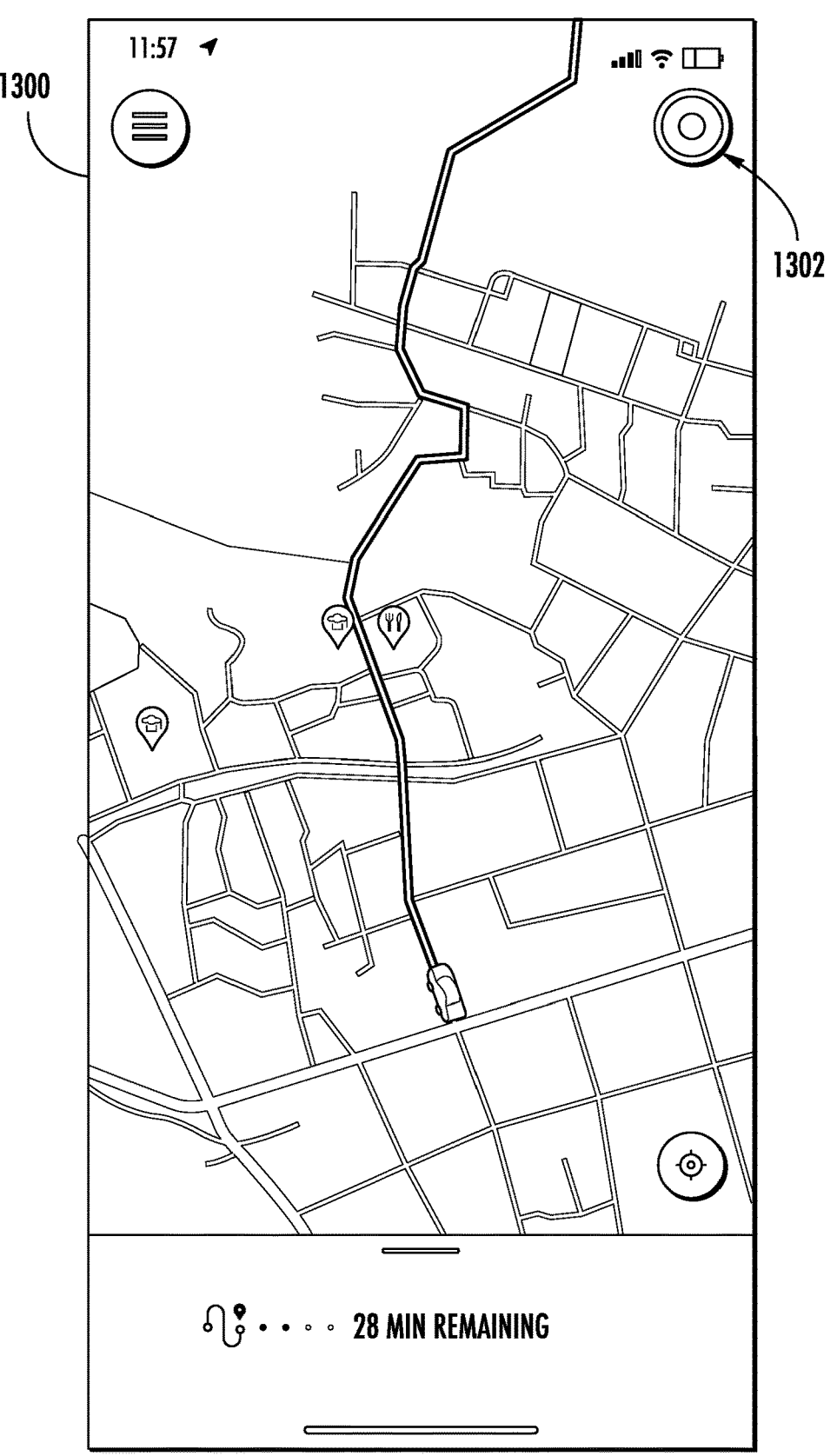
FIG. 13A shows an exemplary graphical user interface for monitoring a progress of the vehicle during the ride.
Figure 13B:
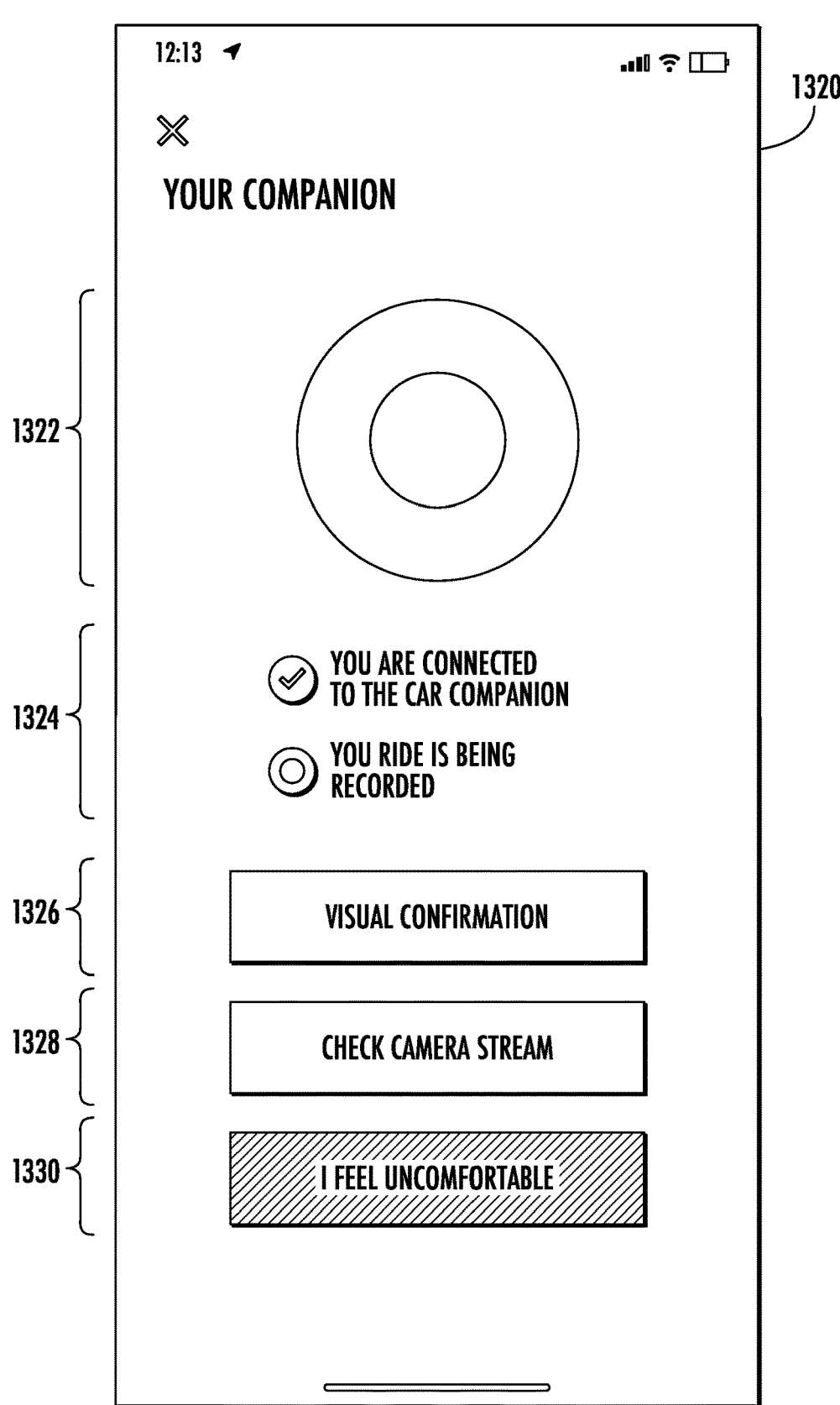
FIG. 13B shows an exemplary graphical user interface for viewing a status and rider options for the monitoring device

FIG. 13A shows an exemplary graphical user interface 1300 for monitoring a progress of the vehicle 102 during the ride. The graphical user interface 1300 includes a monitoring menu option 1302 that can be selected to view a status and rider options for the monitoring device 110. FIG. 13B shows an exemplary graphical user interface 1320 for viewing a status and rider options for the monitoring device 110, which is accessed by selecting the monitoring menu option 1302 of the graphical user interface 1300. The graphical user interface 1320 includes an image 1322 (e.g., a full circle of green light, which is similar to that of the information light 206 in FIG. 2A) and status information 1324 (e.g., "You are connected to the car companion" and "Your ride is being recorded"). Additionally, the graphical user interface 1302 includes a visual confirmation option 1326 via which the rider can request that the monitoring device 110 to display a visual confirmation that it is operational and suitably connected/paired.

The method 1100 continues with displaying, with the monitoring device, a visual confirmation in response to receiving the request (block 1140). Particularly, the cloud storage backend 120 or the server backend of the mobility service provider receives the request that the monitoring device 110 displays a visual confirmation and transmits a corresponding control signal (e.g., a message) to the monitoring device 110. The processor 212 of the monitoring device 110 receives, via the one or more communication devices 218, the control signal from the cloud storage backend 120 or from the server backend of the mobility service provider.

In response to receiving the control signal, the processor 212 operates at least one status indicator light (e.g., the information light 206) to display a visual confirmation that the system is operational. By observing the visual confirmation in response to the request, the rider ensures that monitoring device 110 is operational. The visual confirmation may, for example, include a blinking, flashing, or other modulation of any status indicator light. In one embodiment, the visual confirmation includes displaying a half-circle of light on the information light 206 (similar to that of the information light 206 in FIG. 2C). In one embodiment, the visual confirmation includes a swirling ring of light animation of the information light 206.

In some embodiments, the monitoring device 110 is configured to display a welcome animation which is similar to the visual confirmation in other circumstances in which the visual confirmation was not specifically request by the rider. For example, in one embodiment, the monitoring device 110 is configured to display a welcome animation which is similar to the visual confirmation (e.g., half-circle of light or swirling ring of light) in response to the rider entering the vehicle.

The method 1100 optionally continues with streaming, with the monitoring device, a live video feed to the personal electronic device (block 1150). Particularly, during the ride, the rider can optionally request that the monitoring device 110 streams a live video feed (or live photos) to the rider's personal electronic device 140. To this end, the processor 330 of the rider's personal electronic device 140 operates the display screen 334 to display a graphical user interface via which the rider can request that the monitoring device 110 streams the live video feed (or live photos). In response to a user input from the rider via the graphical user interface, the processor 330 operates the at least one network communications module 336 to transmit, to the cloud storage backend 120 and/or the server backend of the mobility service provider, a request (e.g., a message) that the monitoring device 110 streams the live video feed (or live photos). With reference again to FIG. 13B, the graphical user interface 1320 further includes a camera stream option 1328 via which the rider can request that the monitoring device 110 streams the live video feed (or live photos) to the rider's personal electronic device 140.

The cloud storage backend 120 or the server backend of the mobility service provider receives the request that the monitoring device 110 streams the live video feed (or live photos) and transmits a corresponding control signal (e.g., a message) to the monitoring device 110. The processor 212 of the monitoring device 110 receives, via the one or more communication devices 218, the control signal from the cloud storage backend 120 or from the server backend of the mobility service provider. In response to receiving the control signal, the processor 212 operates the cabin-facing camera 114 (or alternatively the exterior-facing camera 118) and the one or more communication devices 218 to stream a live video feed (or live photos) from the cabin-facing camera 114 (or alternatively the exterior-facing camera 118) to the cloud storage backend 120 or the server backend of the mobility service.

Figure 14:
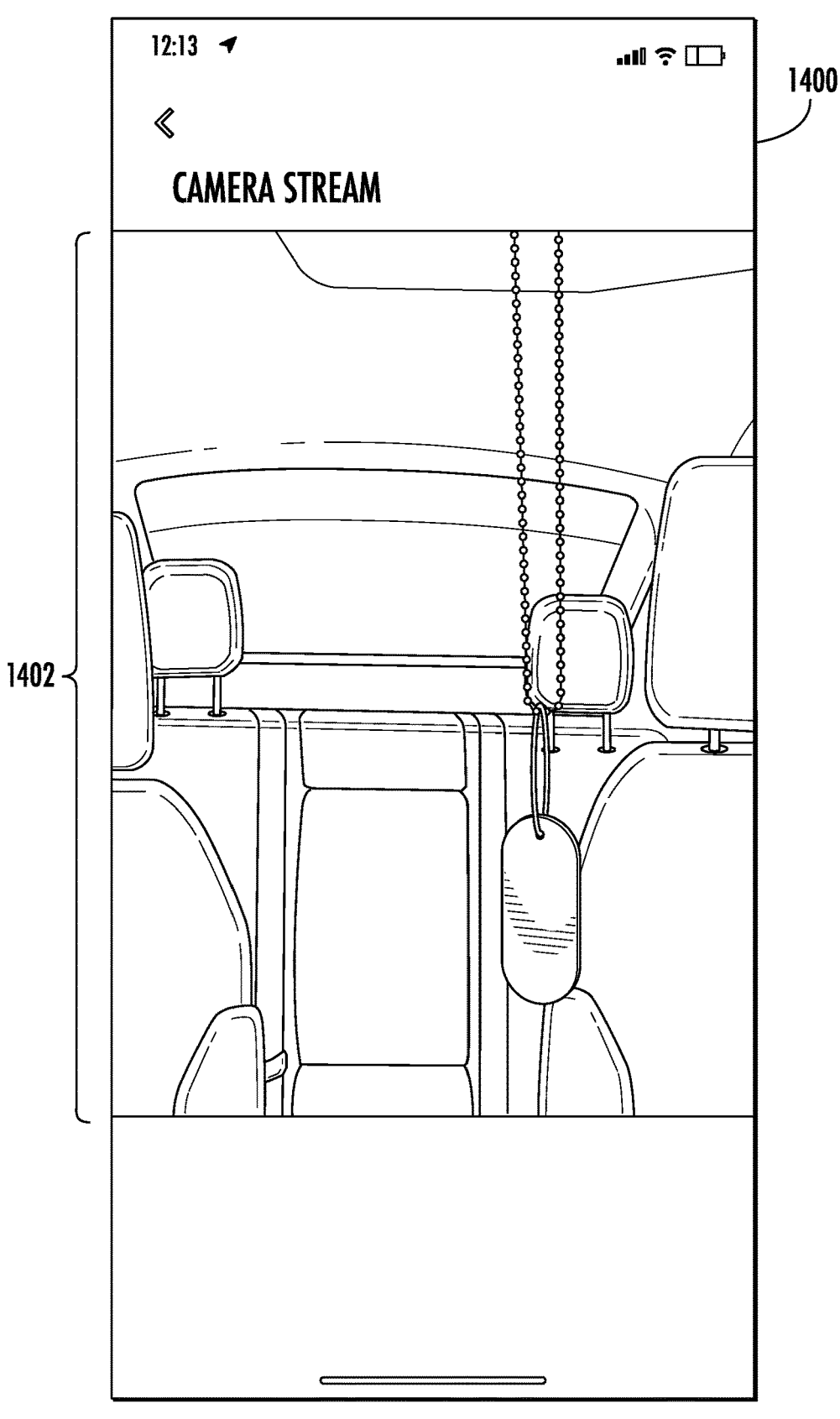
FIG. 14 shows an exemplary graphical user interface for viewing the live video feed.

The method 1100 continues with displaying, with the personal electronic device, the live video feed (block 1160). Particularly, the cloud storage backend 120 or the server backend of the mobility service provider receives the live video feed (or live photos) from the monitoring device 110 and retransmits the live video feed (or live photos) to the rider's personal electronic device 140. The processor 330 of the rider's personal electronic device 140 receives, via the network communications module 308, the live video feed from the cloud storage backend 120 or the server backend of the mobility service provider. The processor 330 operates the display screen 334 to display a graphical user interface including the live video feed (or live photos). This display of the live video feed (or live photos) is essentially responsive to the user input requesting that the monitoring device 110 streams the live video feed (e.g., the selection of camera stream option 1328 in the graphical user interface 1320). FIG. 14 shows an exemplary graphical user interface 1400 for viewing the live video feed (or live photos). The graphical user interface 1400 includes video player 1402 that displays the live video feed (or live photos) received from the monitoring device 110.

Methods for Responding to Safety Incidents and Safety Concerns

Figure 15:
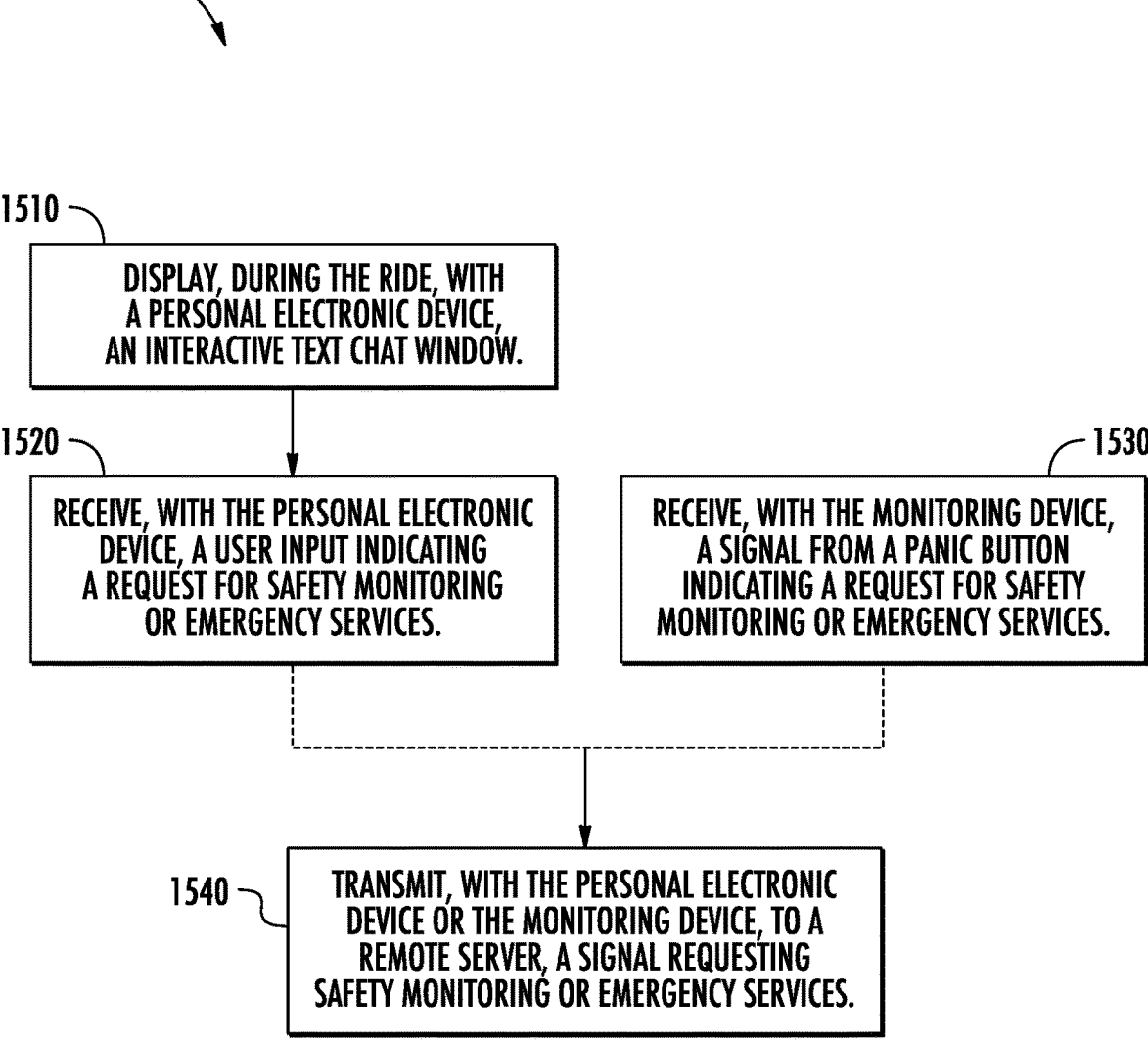
FIG. 15 shows a method for responding to safety incidents during a ride.

FIG. 15 shows a method 1500 for responding to safety incidents during a ride. The method 1500 advantageously provides processes for notifying a mobility service provider of a safety concern or safety incident during the ride, and enables the mobility service provider to respond appropriately. In this way, the safety of the rider and of the driver during the ride is enhanced.

Figure 16:
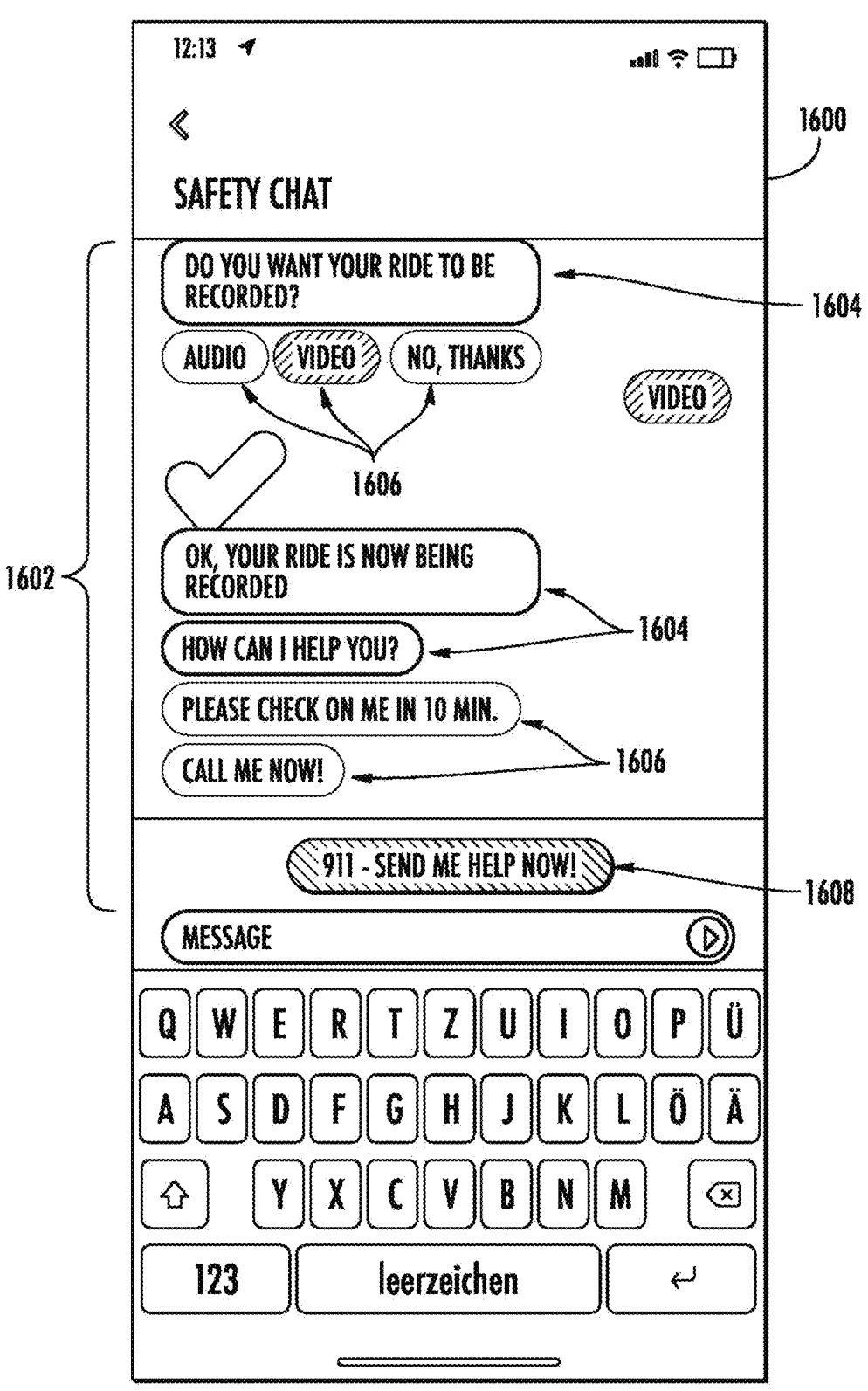
FIG. 16 shows an exemplary graphical user interface for providing an interactive text chat window.

The method 1500 optionally begins with displaying, during the ride, with the personal electronic device, an interactive text chat window (block 1510). Particularly, during a ride, the rider can utilize an inactive text chat window to perform various tasks, at least including requesting or initiating various safety features. To this end, the processor 330 of the rider's personal electronic device 140 operates the display screen 334 to display one or more graphical user interfaces including an inactive text chat window, via which the rider can text chat with a live support agent of the mobility service provider (or of the cloud storage service provider) or with an automated text chat system. FIG. 16 shows an exemplary graphical user interface 1600 for providing an interactive text chat window. The graphical user interface 1600 includes a text chat window 1602, via which the rider can chat with the live support agent or the automated text chat system.

The interactive text chat window at least enables the rider to request or initiate various safety features by selecting an option within the interactive text chat window or by typing a particular text response within the interactive text chat window. To this end, in some embodiments, the processor 330 operates and/or displays the interactive text chat window to include automated text messages from an automated text chat system. For example, with reference to the graphical user interface 1600 of FIG. 16, the text chat window 1602 includes procedurally generated text messages 1604 (e.g., "Do you want your ride to be recorded?," "Ok, your ride is now being recorded," and "How can I help you?"). However, it should be appreciated that similar text messages 1604 can be provided by a live support agent at remote support computer terminal of the mobility service provider or of the cloud storage service provider.

In some embodiments, the processor 330 operates and/or displays the interactive text chat window to include predetermined response options that can be selected by the rider, as a substitute for typing a response. With reference to the graphical user interface 1600 of FIG. 16, the text chat window 1602 includes procedurally generated response options 1606 (e.g., "Audio," "Video," or "No, thanks" as response options to the message "Do you want your ride to be recorded?" and "Please check on me in 10 min." and "Call me now!" as response options to the message "How can I help you?"). Additionally, the text chat window 1602 includes an emergency services request option 1608 (e.g., "911—Send me help now!").

The method 1500 continues with receiving, with the personal electronic device, a user input indicating a request for safety monitoring or emergency services (block 1520). Particularly, the processor 330 of the rider's personal electronic device 140 receives at least one user input from the rider, which indicates a request or initiation of one or more safety features, such as safety monitoring or emergency services. To this end, the processor 330 of the rider's personal electronic device 140 operates the display screen 334 to display one or more graphical user interfaces via which the rider can request or initiate one or more safety features. The graphical user interface, discussed above, including the inactive text chat window is one example of a graphical user interface via which the rider request or initiate one or more safety features.

The various safety features that can be initiated or requested by the rider can take several forms. In a first example, in the case that recording was not previously activated, the rider can request or initiate recording of audio or video. With reference to the graphical user interface 1600 of FIG. 16, the text chat window 1602 provides a text message 1604 (e.g., the message "Do you want your ride to be recorded?") and the rider can select response options 1606 (e.g., "Audio," "Video," or "No, thanks") or type a response using the on-screen keyboard. Based on these user inputs, the processor 330 receives a request to begin recording audio and/or video during the ride.

As a second example, the rider can request that the automated text chat system and/or a live support agent checks in after a predetermined amount of time. With reference to the graphical user interface 1600 of FIG. 16, the text chat window 1602 provides a text message 1604 (e.g., the message "How can I help you?") and the rider can select a response option 1606 (e.g., "Please check on me in 10 min.") or type a response using the on-screen keyboard. Based on these user inputs, the processor 330 receives a request to check in after the predetermined amount of time (e.g., 10 min). In this case, the processor 330 will display a further text message and response option to check in after the predetermined amount of time. If the rider does not respond, some safety action is initiated by the processor 330 in response to the failure to respond (e.g., initiate monitoring of the audio/video of the ride by a support agent or call emergency services).

As a third example, the rider can request that an automated system or live support agent calls the rider at his or her phone number. With reference to the graphical user interface 1600 of FIG. 16, the text chat window 1602 provides a text message 1604 (e.g., the message "How can I help you?") and the rider can select a response option 1606 (e.g., "Call me now!") or type a response using the on-screen keyboard. Based on these user inputs, the processor 330 receives a request to call the rider.

As a fourth example, the rider can request that an automated system or live support agent calls an emergency service provider, such as the police or an ambulance, to be sent to the location of the vehicle 102. With reference to the graphical user interface 1600 of FIG. 16, the text chat window 1602 includes an emergency services request option 1606 (e.g., "911—Send me help now!"), which can be selected to request that the emergency service provider is sent to the location of the vehicle 102. Based on these user inputs, the processor 330 receives a request to call emergency services.

As a fifth example, the rider can request that a live support agent or other third party monitors the live real-time audio and/or video stream that is captured by the monitoring device 110. Particularly, the graphical user interface may include an option (not shown) similar to those discussed that can be selected to request that a live support agent monitors the live audio and/or video stream. Based on these user inputs, the processor 330 receives a request live real-time monitoring.

The method 1500 optionally begins with receiving, with the monitoring device, a signal from a panic button indicating a request for safety monitoring or emergency services (block 1530). Particularly, in some embodiments, the processor 212 of the monitoring device 110 receives a signal from the panic button 150, which indicates a request or initiation of one or more safety features, such as safety monitoring or emergency services. The signal from the panic button 150 is received by a wired or wireless connection between the monitoring device 110 and the panic button 150.

The panic button 150 can be pressed by the rider or by the driver to request or initiate any of the various safety features discussed above with respect to blocks 1510 and 1520 of the method 1500, including: (1) requesting or initiating recording of audio or video (in the case that such recording was not previously activated), (2) requesting that an automated text chat system and/or a live support agent checks in after a predetermined amount of time, (3) requesting that an automated system or a live support agent calls the rider or the driver at his or her phone number, (4) requesting that an automated system or live support agent calls an emergency service provider, such as the police or an ambulance, to be sent to the location of the vehicle 102, and (5) requesting that a live support agent monitors the live real-time audio and/or video stream that is captured by the monitoring device 110.

The method 1500 continues with transmitting, with the personal electronic device or the monitoring device, to a remote server, a signal requesting safety monitoring or emergency services (block 1540). Particularly, in response to receiving a request or initiation of any of the various safety features discussed above, the processor 330 of the rider's personal electronic device 140 operates the network communications module 336 to transmit a corresponding request (e.g., a message) to the server backend of the mobility service provider and/or the cloud storage backend 120. Likewise, in response to receiving a signal from the panic button 150 indicating a request or initiation of any of the various safety features discussed above, the processor 212 of the monitoring device 110 operates the communication devices 218 to transmit a corresponding request (e.g., a message) to the server backend of the mobility service provider and/or the cloud storage backend 120. In any case, the request is configured to initiate a corresponding response from the mobility service provider and/or a corresponding response by the monitoring device 110, e.g. (1) recording of audio/video by the monitoring device 110, (2) a check in on the rider or driver, (3) a call to the rider or the driver, (4) a call to emergency services, and/or (5) real-time monitoring of audio and/or video by a live support agent.

Figure 17:
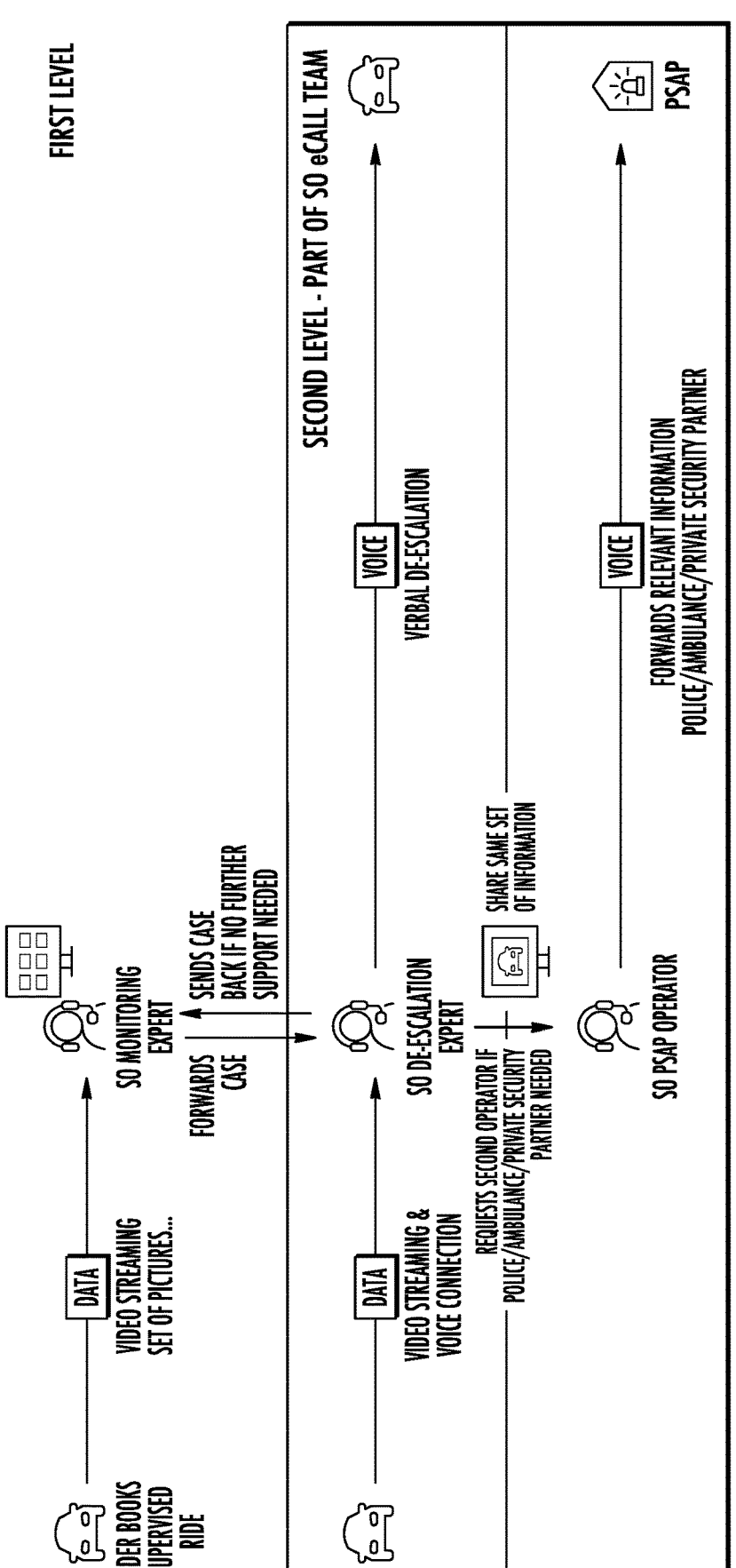
FIG. 17 shows a multi-level incident resolution process than may be implemented by a safety officer in the event that a rider or driver requests assistance during the ride.

FIG. 17 shows a multi-level incident resolution process that may be implemented by a safety officer (SO) in the event that a rider or driver requests assistance during the ride. Particularly, at a first level, live audio/video monitoring of the ride can be initiated in which a live safety officer monitors the ride. If further support is needed, at a second level, a safety officer can verbally communicate with the driver and rider in the vehicle during the ride to verbally deescalate the situation, using a two-way audio feature of the monitoring device 110. If necessary, third-party assistance can be requested such as from the police, an ambulance, or private security partners.

Figure 18:
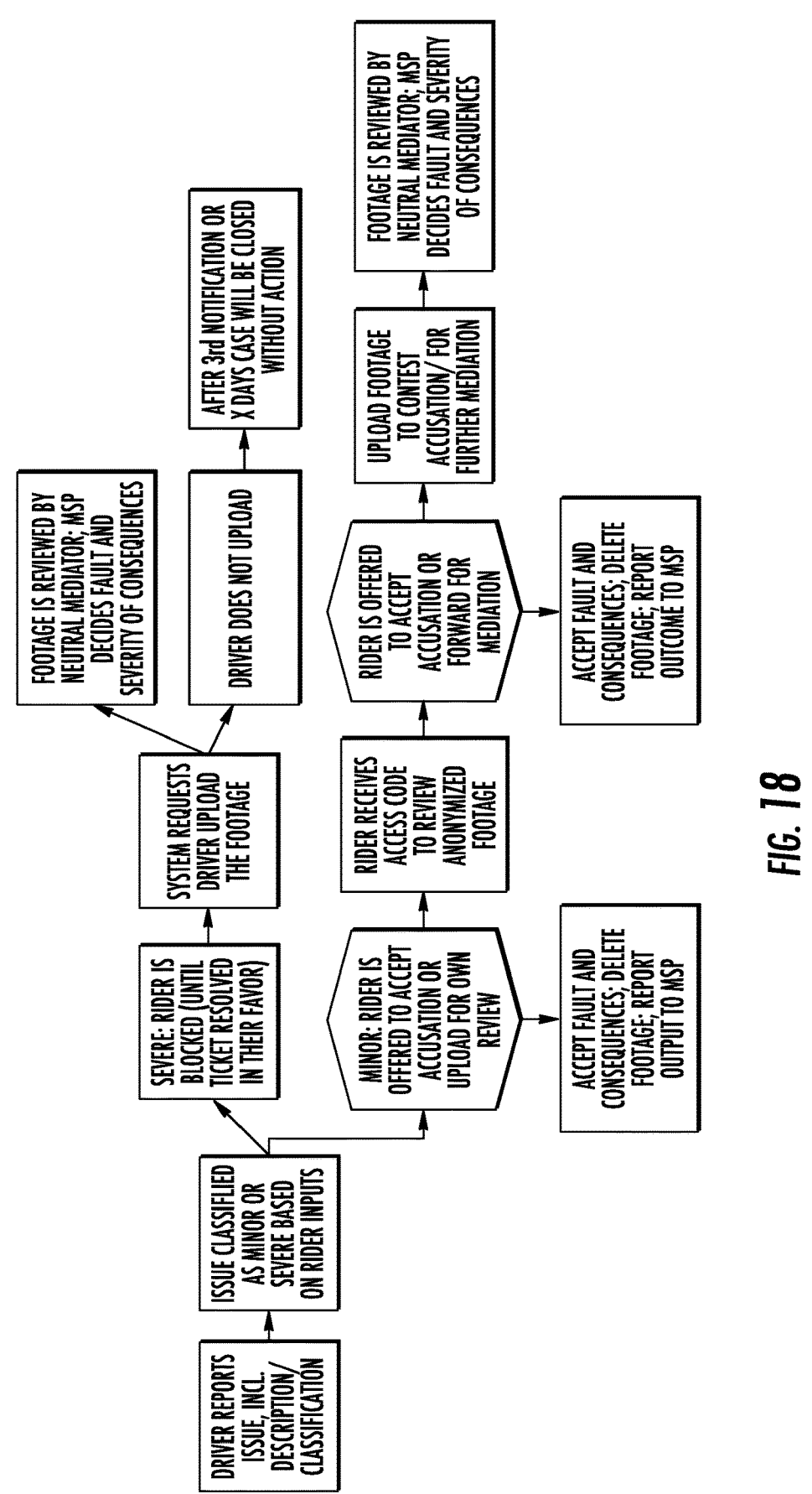
FIG. 18 shows a complaint process in which riders and drivers can potentially resolve disputes on their own with mediation by the mobility service provider.

FIG. 18 shows a complaint process in which riders and drivers can potentially resolve disputes on their own without mediation by the mobility service provider. In the illustrated embodiment, a driver has accused the rider but an equivalent process can occur when the rider accuses the driver. First, a driver/rider reports an issue and includes a description of the incident. The incident is classified as being major or minor by the backend. If the incident is a minor incident, the accused rider/driver can (1) accept fault and the consequences, in which the recorded footage is deleted and not uploaded for review, or (2) not accept fault. If fault is not accepted, the accused rider/driver can view the footage before being offered another opportunity to accept fault and the consequences, as before. If the accused rider/driver still does not accept fault, the footage is uploaded and reviewed by the mobility service provider or by the cloud storage service provider to determine fault. If the incident is a major incident, the accused rider/driver is temporarily banned from the mobility service provider and the footage is requested for upload so that the mobility service provider or the cloud storage service provider can review the footage to determine fault. If the driver does not upload the footage or prevents upload of the footage, a default judgment can be made (no action in the case that the driver accused the rider, or some predefined default consequences if the rider accused the driver). However, this is only in the event that the mobility service provider requires driver approval to upload, which is dependent on the agreed terms and conditions. In some cases, footage can be uploaded automatically without the driver's explicit consent in each individual dispute.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A system for monitoring a ride in which a vehicle picks up a rider at a pickup location and transports the rider to a drop-off destination, the system comprising:
    at least one sensor arranged in the vehicle and configured to capture sensor data during the ride;
    at least one indicator light;
    a transceiver configured to communicate with at least one remote server;
    a memory configured to store data; and
    a processor operatively connected to the at least one sensor, the transceiver, and the memory, the processor being configured to:
        receive, from the at least one remote server via the transceiver, a signal indicating one of (i) that first sensor data is to be captured during the ride or (ii)

that the first sensor data is not to be captured during the ride, the signal depending on a selection made by the rider using a personal electronic device of the rider;
        operate, in response to the signal indicating that the first sensor data is to be captured during the ride, the at least one sensor to capture the first sensor data during the ride and store the first sensor data captured during the ride in the memory;
        receive, from the at least one remote server via the transceiver, a request from the rider for a visual confirmation that indicates whether the at least one sensor is currently capturing sensor data, the request having been generated by the rider using the personal electronic device of the rider; and
        operate, in response to the request, the at least one indicator light to display the visual confirmation depending on whether the at least one sensor is currently capturing sensor data, the visual confirmation including operating the at least one indicator light in a predetermined manner.

2. The system according to claim 1, the processor being further configured to:
    receive, from the at least one remote server via the transceiver, a request to upload the first sensor data captured during the ride; and
    upload the first sensor data to the at least one remote server via the transceiver, in response to the request to upload the first sensor data captured during the ride.

3. The system according to claim 1, the processor being further configured to:
    disable, in response to the signal indicating that the first sensor data is not to be captured during the ride, one of (i) capture of the first sensor data by the at least one sensor during the ride and (ii) storage of the first sensor data in the memory during the ride.

4. The system according to claim 1 further comprising:
    a display device arranged within the vehicle so as to be visible from outside the vehicle,
    wherein the processor is operatively connected to the display device and is further configured to:
        receive, from the at least one remote server via the transceiver, data indicating a customization that is associated with the rider; and
        display, prior to the vehicle picking up the rider at the pickup location, a graphical element on the display device, the graphical element being customized based on the customization.

5. The system according to claim 4, wherein the customization includes a color and the processor is further configured to:
    display the graphical element on the display device with the color applied to at least one of (i) a background of the graphical element and (ii) a portion of the graphical element.

6. The system according to claim 4, wherein the customization includes a text string and the processor is further configured to:
    display the graphical element on the display device including the text string.

7. The system according to claim 4, the processor being further configured to:
    receive further signal indicating a request from the at least one remote server via the transceiver; and
    flash, on the display device, the graphical element in response to receiving the request.

8. The system according to claim 4, the processor further configured to:

display the graphical element in response to the vehicle being one of (i) within a predetermined distance from the pickup location and (ii) within a predetermined travel time from the pickup location.

9. The system according to claim 1, the processor being further configured to:

operate, while in use at times other than during the ride, the at least one sensor to capture second sensor data and store the second sensor data in the memory.

10. The system according to claim 1 further comprising:

a button arranged within the vehicle that is communicatively connected with the processor, wherein the processor is further configured to, in response to the button being pressed during the ride, transmit a request to the at least one remote server via the transceiver, the request being configured to cause the at least one remote server to request that one of (i) a third party monitors the first sensor data captured by the at least one sensor and (ii) an emergency service provider be sent to a location of the vehicle.

\* \* \* \* \*